United States Patent
Boriskin et al.

(10) Patent No.: US 11,163,175 B2
(45) Date of Patent: Nov. 2, 2021

(54) DEVICE FOR FORMING A FIELD INTENSITY PATTERN IN THE NEAR ZONE, FROM INCIDENT ELECTROMAGNETIC WAVES

(71) Applicant: INTERDIGITAL CE PATENT HOLDINGS, Paris (FR)

(72) Inventors: Artem Boriskin, Cesson-Sevigne (FR); Laurent Blonde, Cesson-Sevigne (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/087,670

(22) PCT Filed: Mar. 24, 2017

(86) PCT No.: PCT/EP2017/057129
§ 371 (c)(1),
(2) Date: Sep. 24, 2018

(87) PCT Pub. No.: WO2017/162880
PCT Pub. Date: Sep. 28, 2017

(65) Prior Publication Data
US 2019/0101769 A1    Apr. 4, 2019

(30) Foreign Application Priority Data
Mar. 24, 2016    (EP) .................................... 16305343

(51) Int. Cl.
G02B 27/56    (2006.01)
B82Y 20/00    (2011.01)
G02B 6/122    (2006.01)

(52) U.S. Cl.
CPC .............. *G02B 27/56* (2013.01); *B82Y 20/00* (2013.01); *G02B 6/1225* (2013.01)

(58) Field of Classification Search
CPC ............................... G02B 27/56; B82Y 20/00
(Continued)

(56) References Cited

U.S. PATENT DOCUMENTS 3,718,383 A    2/1973 Moore
3,873,408 A    3/1975 Hensler
(Continued)

FOREIGN PATENT DOCUMENTS

CN    1452722 A    10/2003
CN    1823456       8/2006
(Continued)

OTHER PUBLICATIONS

Ghenuche et al., Multi-focus parallel detection of fluorescent molecules at picomolar concentration with photonic nanojets arrays—Applied Physics Letters, American Institute of Physics, 2014, 105 (13), pp. 131102 Sep. 29, 2014.
(Continued)

*Primary Examiner* — Tuyen Tra
(74) *Attorney, Agent, or Firm* — Invention Mine LLC

(57) ABSTRACT

The present disclosure concerns a device for forming a field intensity pattern in the near zone, from electromagnetic waves which are incident on said device. Notably, such a device allows confining electromagnetic waves, which are incident on the device, into beams of radiation in the near zone. It comprises at least one layer of dielectric material, which surface has at least one abrupt change of level forming a step. A lower and lateral part of said surface with respect to said step is in contact with a substance having a refractive index lower than that of said dielectric material. For an incident electromagnetic wave impinging upon the device in the vicinity of such a step, the corresponding step of index it encounters produces a complex electromagnetic
(Continued)

phenomenon, which allows generating low-dispersive condensed beams and specific field patterns in the near zone.

19 Claims, 35 Drawing Sheets

(58) Field of Classification Search
USPC ........................................ 359/237, 238, 240
See application file for complete search history.

(56) References Cited

U.S. PATENT DOCUMENTS

| | | |
|---|---|---|
| 3,904,268 A | 9/1975 | Keck |
| 4,952,037 A | 8/1990 | Oikawa |
| 6,236,513 B1 | 5/2001 | Mallary |
| 6,569,575 B1 | 5/2003 | Biebuyck |
| 6,594,430 B1 | 7/2003 | Rausch |
| 6,753,131 B1 | 6/2004 | Rogers |
| 6,804,189 B2 | 10/2004 | Inase |
| 7,057,151 B2 | 6/2006 | Lezec |
| 7,394,535 B1 | 7/2008 | Chen et al. |
| 7,541,115 B1 | 6/2009 | Volk |
| 7,612,883 B2 | 11/2009 | Que et al. |
| 8,003,965 B2 | 8/2011 | Grbic et al. |
| 8,052,908 B2 | 11/2011 | Peckerar |
| 8,448,247 B2 | 5/2013 | Stute |
| 8,488,247 B2 | 7/2013 | Cai |
| 8,508,830 B1 | 8/2013 | Wang |
| 8,552,416 B2 | 10/2013 | Kim |
| 8,554,031 B2 | 10/2013 | Astratov |
| 8,953,064 B1 | 2/2015 | Ng et al. |
| 9,151,891 B2 | 10/2015 | Ma |
| 9,170,203 B2 | 10/2015 | Bisht et al. |
| 9,389,424 B1 | 7/2016 | Schowengerdt |
| 10,677,992 B2 * | 6/2020 | Boriskin ............. G02B 5/1814 |
| 10,678,127 B2 | 6/2020 | Boriskin |
| 10,846,835 B2 | 11/2020 | Gill |
| 2003/0036674 A1 | 2/2003 | Bouton |
| 2008/0024792 A1 | 1/2008 | Pendry |
| 2008/0089367 A1 | 4/2008 | Srinivasan et al. |
| 2008/0231863 A1 | 9/2008 | Chen |
| 2009/0068597 A1 | 3/2009 | Shiraishi |
| 2010/0006784 A1 | 1/2010 | Mack |
| 2010/0067842 A1 | 3/2010 | Seidman |
| 2010/0265590 A1 | 10/2010 | Bowers |
| 2010/0320213 A1 | 12/2010 | Kelly |
| 2010/0320513 A1 | 12/2010 | Goarin |
| 2011/0063717 A1 | 3/2011 | Consonni |
| 2012/0326309 A1 | 12/2012 | Andry et al. |
| 2013/0308127 A1 | 11/2013 | Bisht |
| 2013/0335677 A1 | 12/2013 | You |
| 2014/0043611 A1 | 2/2014 | Narasimhan |
| 2014/0111677 A1 | 4/2014 | Fukuda |
| 2014/0333926 A1 | 11/2014 | Bond |
| 2015/0090862 A1 | 4/2015 | Matsui |
| 2015/0146180 A1 | 5/2015 | Lee |
| 2015/0177619 A1 | 6/2015 | Kobrin |
| 2015/0212242 A1 | 7/2015 | Chen |
| 2015/0243096 A1 | 8/2015 | Schowengerdt |
| 2015/0248790 A1 | 9/2015 | Schowengerdt |
| 2015/0268415 A1 | 9/2015 | Schowengerdt |
| 2016/0084761 A1 | 3/2016 | Rothberg |
| 2016/0147138 A1 | 5/2016 | Shih |
| 2016/0187788 A1 | 6/2016 | Onose |
| 2016/0223739 A1 | 8/2016 | Yoon |
| 2016/0240419 A1 | 8/2016 | Sieber |
| 2016/0259253 A1 | 9/2016 | Luo |
| 2016/0265747 A1 | 9/2016 | Nagao |
| 2016/0298875 A1 | 10/2016 | Dellea |
| 2018/0210214 A1 | 7/2018 | Kim |
| 2018/0354844 A1 | 12/2018 | Drazic |
| 2019/0101700 A1 | 4/2019 | Boriskin |
| 2019/0101769 A1 | 4/2019 | Boriskin |
| 2019/0250315 A1 | 8/2019 | Boriskin |
| 2020/0233223 A1 | 7/2020 | Shramkova |

FOREIGN PATENT DOCUMENTS

| | | |
|---|---|---|
| CN | 1853131 | 10/2006 |
| CN | 101088040 | 12/2007 |
| CN | 101419337 A | 4/2009 |
| CN | 101819326 | 9/2010 |
| CN | 102916343 A | 2/2013 |
| CN | 103353675 | 10/2013 |
| CN | 105974576 A | 9/2016 |
| EP | 1398656 A1 | 3/2004 |
| EP | 3223062 | 9/2017 |
| EP | 3223063 | 9/2017 |
| JP | 2005141075 A | 6/2005 |
| JP | 2011014857 A | 1/2011 |
| KR | 20120111288 | 10/2012 |
| RU | 2591282 C1 | 7/2016 |
| WO | 3157559 A1 | 8/2001 |
| WO | 03025635 A1 | 3/2003 |
| WO | 2003025635 A1 | 3/2003 |
| WO | WO03025635 | 3/2003 |
| WO | 2008080117 A2 | 7/2008 |
| WO | 2010114834 A1 | 10/2010 |
| WO | 2010114857 A1 | 10/2010 |
| WO | 2014182893 A1 | 11/2014 |
| WO | 2017007431 | 1/2017 |
| WO | 2017162880 | 9/2017 |
| WO | WO2017162881 | 9/2017 |
| WO | WO2017162882 | 9/2017 |
| WO | 2018073407 A1 | 4/2018 |
| WO | 2018073426 A1 | 4/2018 |

OTHER PUBLICATIONS

Kress et al. A review of headmounted displays (HMD) technologies and applications for consumer electronics—Proc. of SPIE vol. 8720 87200A-1 May 31, 2013.

Kotlyar et al. Photonic nanojets generated using square-profile microstep_Applied Optics KotlyarFeldmanol. 53, No. 24 pp. 5532 Aug. 20, 2014.

Tirosh New Flat Lenses Technology Could Offer Smaller Lenses with Zero Chromatic Aberration—DIYPhotography Feb. 20, 2015.

Heifetz et al. Photonic nanojects_ Journal of Computational and Theoretical Nanoscience_vol. 6 pp. 1979,1992 Sep. 1, 2009.

Novotny et al. Near-field optical microscopy and spectroscopy with pointed probes—Annu. Rev. Phys. Chem. 2006. 57:303-31 Dec. 6, 2005.

Gu et al. Color generation via subwavelength plasmonic nanostructures—Nanoscale, 2015, 7, 6409 Mar. 16, 2015.

Hua et al. A 3D integral imaging optical seethrough headmounted display_Optical Society of America Optics Express Jun. 2, 2014 | vol. 22, No. 11 pp. 13484 May 28, 2014-05-28.

Kong et al. Photonic nanojetenabled optical data storage—Optics Express vol. 16, No. 18 pp. 13713-13719 Aug. 21, 2008.

Mukawa et al. A full-color eyewear display using planar waveguides with reflection volume holograms—Journal of the SID 17/3, 2009 Jul. 1, 2009.

Nishiwaki et al. Efficient colour splitters for high pixeldensity image sensors_Nature Photonics | vol. 7 | Mar. 2013 pp. 240 Feb. 3, 2013.

Pacheco-Pena et al Multifrequency focusing and wide angular scanning of terajets_Optical Society of America 2014 _ Optics Letters vol. 40, No. 2 pp. 245-248 Jan. 13, 2015.

Pacheco-Pena et al Terajets produced by dielectric cuboids— Applied Physics Letters, vol. 105 pp. 084102 Aug. 21, 2014.

Stafeev et al Near field diffraction of laser light by dielectric corner step_Proceedings of SPIE vol. 9031, pp. 903110A_Saratov fall Meeting 2013 Jan. 3, 2014.

Khorasaninejad et al. Metalenses: Versatile multifunctional photonic components_Science, vol. 358 Dec. 1, 2017.

Huang et al. Nanohole array as a lens_Nano Letters 8 (8) pp. 2469-2472 Jun. 24, 2008.

Junesch et al. Optical Properties of Nanohole Arrays in Metal-Dielectric Double Films Prepared by Mask-on-Metal Colloidal Lithography—ACSNano, vol. 6, No. 11 Oct. 25, 2012.

(56) References Cited

OTHER PUBLICATIONS

Liu Photonic jets produced by dielectric micro cuboids—Applied Optics—vol. 53, Issue 29 pp. 8694-8699—Abstract Oct. 10, 2015.
Liu Ultra-high transmission of photonic nanojet induced modes in chains of core-shell microcylinders—Physics Letters A 376 (2012) pp. 3261-3266 Sep. 24, 2013.
Minin et al. Localized Photonic jets from flat 3D dielectric cuboids in the reflection mode_Optics Letters, vol. 40, No. 10 pp. 2329-2332 May 11, 2015.
Wei et al. Diffraction induced near-field optical images in mesoscale are—dielectric structures—Journal of the Optical Society of America B, vol. 20, No. 7 pp. 1503-1507. Jul. 1, 2003.
Minin et al. Localized EM and photonic jets from nonspherical and nonsymmetrical dielectric mesoscale objects: brief review—Annalen der Physik, vol. 527, No. 7-8 pp. 491-497 Jun. 1, 2015.
Anonymous Diffraction—Wikipedia May 16, 2017.
Matsui et al. Transmission phase control by stacked metal-dielectric hole array with two dimensioanl geometric lesign—Optics Express, vol. 20, No. 14 pp. 16092-160103 Jun. 29, 2012.
Grbic et al. Near-Field Plates_Subdiffraction Focusing with Patterned Surfaces _ Science Apr. 25, 2008: vol. 320, Issue 5875, pp. 511-513 Sep. 16, 2015.
Guo et al. Fabrication of optical fiber probes for scanning nearfield optical microscopy_MSURJ vol. 3,Issue 1, pp. 32,39 Mar. 2008.
Gu, Yinghong, et al., "Plasmonic Structures Color Generation Via Subwavelength Plasmonic Nanostructures". Nanoscale, vol. 7, (2015), pp. 6409-6419.
International Search Report and Written Opinion of the International Searching Authority for PCT/EP2017/057129 dated May 30, 2017, 12 pages.
International Preliminary Report on Patentability for PCT/EP2017/057129 dated Sep. 25, 2018, 9 pages.
International Search Report and Written Opinion of the International Searching Authority for PCT/EP2017/057131 dated May 30, 2017, 12 pages.
International Preliminary Report on Patentability for PCT/EP2017/057131 dated Sep. 25, 2018, 9 pages.
Mukawa, Hiroshi, et al., "A Full -Color Eyewear Display Using Planar Waveguides with Reflection vol. Holograms". Journal of the Society for Information Display (SID), vol. 17, No. 3, (2009), pp. 185-193.
Pacheco-Pena, V., et al., "Terajets Produced By 3D Dielectric Cuboids". Applied Physics Letters vol. 105, No. 8, (2014), pp. 1-12.
International Search Report and Written Opinion of the International Searching Authority for PCT/EP2017/057130, dated Jun. 26, 2017, 11 pages.
International Preliminary Report on Patentability for PCT/EP2017/057130, dated Sep. 25, 2018, 7 pages.
Stafeev, S., et al., "Near-Field Diffraction of Laser Light by Dielectric Corner Step". Proceedings of SPIE, vol. 9031, (2014), p. 90311A-1-7.
Ghenuche, P., et al. "Multi-Focus Parallel Detection of Fluorescent Molecules at Picomolar Concentration with Photonic Nanojets Arrays". Applied Physics Letters, American Institute of Physics, (2014), vol. 105, No. 13, 7 pages.
Kress, Bernard, et al., "A Review of Head-Mounted Displays (HMD) Technologies and Applications for Consumer Electronics". Proceedings of SPIE, vol. 8720, (2013), p. 87200A-1-13.
Tirosh, Udl, "New Flat Lenses Technology Could Offer Smaller Lenses with Zero Chromatic Aberration". DIY Photography, Feb. 20, 2015, 8 pages.
Khorasaninejad, Mohammadreza, et al., "Metalenses: Versatile Multifunctional Photonic Components". Planar Optics, Science 358, Dec. 1, 2017, pp. 1-8.
Huang, Fu Min, et al., "Nanohole Array as a Lens". Nano Letters, vol. 8, No. 8., (2008), 8 pages.
Junesch, Juliane, et al., "Optical Properties of Nanohole Arrays in Metal—Dielectric Double Films Prepared by Mask-On-Metal Colloidal Lithography". ACS Nano, vol. 6, No. 11, (2012), pp. 10405-10415.
Liu, Cheng-Yang, "Ultra-High Transmission of Photonic Nanojet Induced Modes in Chains of Core-Shell Microcylinders". Physics Letters A, vol. 376, (2012), pp. 3261-3266.
Minin, Igor V., et al., "Localized Photonic Jets from Flat, Three-Dimensional Dielectric Cuboids in The Reflection Mode". Optics Letters, vol. 40, No. 10, May 15, 2015, pp. 2329-2332.
Wei, Pei-Kuen, et al., "Diffraction-Induced Near-Field Optical Images in Mesoscale Air—Dielectric Structures". Journal of the Optical Society of America, vol. 20, No. 7, Jul. 2003, pp. 1503-1507.
Minin, IgorV., et al., "Localized EM And Photonic Jets from Non-Spherical and Non-Symmetrical Dielectric Mesoscale Objects: Brief Review". Annual Physics (Berlin), vol. 527, No. 7-8, (2015), pp. 491-497.
Wikipedia, "Diffraction". Wikipedia web article retrieved from the internet on May 16, 2017, pp. 1-14.
Liu, Cheng-Yang, "Ultra-Elongated Photonic Nanojets Generated By A Graded-Index Microellipsoid". Progress In Electromagnetics Research Letters, vol. 37, (2013), pp. 153-165.
Royon, Arnaud, "Nonlinear Femtosecond Near Infrared Laser Structuring In Oxide Glasses". Electronic Theses and Dissertations, (2009), 174 pages.
Machine translation of RU 2591282 C1 published on Jul. 20, 2016, 5 pages.
Liu, Cheng-Yang, et al., "Engineering Photonic Nanojets by Core-Shell Micro-Cuboids". IEEE Proceedings of the 16th International Conference on Nanotechnology, Aug. 22-25, 2016, pp. 113-115.
Kong, Soon-Cheol, et al., "Quasi One-Dimensional Light Beam Generated By A Graded-Index Microsphere". Optical Society of America, Optics Express, vol. 17, No. 5, Mar. 2, 2009, pp. 3722-3731.
International Preliminary Report on Patentability for PCT/EP2017/076881 dated Apr. 23, 2019, 6 pages.
International Search Report and Written Opinion of the International Searching Authority for PCT/EP2017/076881 dated Feb. 2, 2018, 10 pages.
Venugopal, Gunasekaran, et al., "Advances in Micro/Nano Electromechanical Systems and Fabrication Technologies". Chapters, entitled "Nanolithography", Intech Press, (2013), pp. 187-205.
Xie, X.N., et al., "Nanoscale Materials Patterning and Engineering by Atomic Force Microscopy Nanolithography". Materials Science and Engineering R54, (2006), pp. 1-48.
Wu, Wei, et al., "A Deep Sub-Wavelength Process for The Formation of Highly Uniform Arrays of Nanoholes And Nanopillars". Nanotechnology, vol. 18, 485302, (2007), pp. 1-4.
Cheung, Chin Li, et al., "Fabrication of Nanopillars By Nanosphere Lithography". Nanotechnology, vol. 17, No. 5, Mar. 14, 2006, pp. 1339-1343.
Xu, Chen, et al., "Photon Nanojet Lens: Design, Fabrication and Characterization". Nanotechnology, vol. 27, Mar. 4, 2016.
Mohseni, Hooman, "Photonic Jet and its Applications in Nano-Photonics". Frontiers in Optics/Laser Science (2015), 2 pages.
Voison, Pauline, "New Generation Lithography By UV-Assisted Nanoimprint: Study and Development of Materials and Processes for Microelectronic Application" Abstract of PhD Thesis, Universete Joseph Fourier, (2007), 173 pages.
Yu, Geints, et al., "Modeling Spatially Localized Photonic Nanojets From Phase Diffraction Gratings". Journal of Applied Physics, vol. 119, No. 15,153101, Apr. 21, 2016, p. 153101-1-6.
Kim, Jooyoung, et al., "Fabrication of Palsmonic Nanodiscs by Photonic Nanojet Lithography". Applied Physics Express, vol. 5, 025201, Jan. 19, 2012, p. 025201-1-3.
Kushwaha, P. K., et al., "Controlled Shaping of Photonic Nanaojets Using Core Shell Microspheres". International Conference on Optics and Photonics, Proceedings of SPIE, vol. 9654, (2015), p. 96541H-1-6.
Timoschenko, Igor, "Scanning Nanaojet Lithograph and Microscope". Photonics Applications in Astronomy, Communications, Industry, and High-Energy Physics Experiments, Proceedings of SPIE vol. 6937, 69373R (2007), pp. 69373R-1-5.
Liu, Cheng-Yang, et al., "Geometric Effect On Photonic Nanojet Generated By Dielectric Microcylinders With Non-Cylindrical Cross-Sections". Optics Communications, vol. 380, (2016), pp. 287-296.

(56) References Cited

OTHER PUBLICATIONS

Boriskina, Svetlana, V., "Spectrally Engineered Photonic Molecules as Optical Sensors with Enhanced Sensitivity: A Proposal and Numerical Analysis" Journal of Optical Society of America, vol. 23, No. 8, Aug. 2006, pp. 1565-1573.
Liu, Cheng-Yang, et al., "Photonic Nanojet Modulation By Elliptical Microcylinders". Optik, vol. 125, (2014), pp. 1043-4046.
Khaleque, Abdul, et al., "Tailoring The Properties Of Photonic Nanojets By Changing The Material And Geometry Of The Concentrator". Progress In Electromagnetics Research, vol. 48, (2014), pp. 7-13.
Machine Translations of Patent Publication JP2011014857A, published on Jan. 20, 2011, 34 pages.
International Search Report and Written Opinion of the International Searching Authority for PCT/EP2017/076877, dated Jan. 17, 2018, 11 pages.
International Preliminary Report on Patentability for PCT/EP2017/076877 dated Apr. 23, 2019, 7 pages.
Sinai, P., "Correction of Optical Aberrations by Neutron Irradiation". Applied Optics, vol. 10, Issue 1, Jan. 1971, pp. 99-104.
Valentine, Jason, et al., "An Optical Cloak Made Of Dielectrics". Nature Materials Letters, vol. 8, No. Jul. 7, 2009, pp. 568-571.
Dang, Cuong, et al., "Red, Green And Blue Lasing Enabled By Single-Exciton Gain In Colloidal Quantum Dot Films". Nature Nanotechnology Letters, vol. 7., May 2012, pp. 335.
Cai, Wenshan, et al., "Optical Cloaking With Metamaterials". Nature Photonics, vol. 1, No. 4, Apr. 2007, 224-227.
Stafeev, Sergey S., et al., "Measurement Of Photonic Nanojet Generated By Square-Profile Microstep". Proceedings of SPIE, vol. 9448, (2015), p. 94482C-1-5.
Alitalo, Pekka, et al., "Electromagnetic Cloaking With Metamaterials". Materials Today, vol. 12, No. 3, Mar. 2009, pp. 22-29.
Landy, Nathan I., et al., "Guiding Light With Conformal Transformations". Optical Society of America, Optics Express, vol. 17, No. 17, Aug. 17, 2009, pp. 14872-14879.
Monticone, Francesco, et al., "Invisibility Exposed: Physical Bounds On Passive Cloaking". Optical Society of America, Optica, vol. 3, No. 7, Jul. 2016, pp. 718-724.
Pendry, J. B., et al., "Controlling Electromagnetic Fields". Science, vol. 312, Jun. 23, 2006, pp. 1780-1782.
Schmied, Roman, et al., "Conformal Carpet And Grating Cloaks". Optical Society of America, Optics Express, vol. 18, No. 23, Nov. 8, 2010, pp. 24361-24367.

Matsui, Tatsunosuke, et al., "Finite-Difference Time-Domain Analysis Of Photonic Nanojets From Liquid-Crystal-Containing Microcylinder". Japanese Journal of Applied Physics 53, 01AE04, (2014), pp. 1-4.
Mahariq, Ibrahim, et al., "Photonic Nanojet Analysis by Spectral Element Method". IEEE Photonics Journal, vol. 6, No. 5, Oct. 2014, 15 pages.
Geints, Yurii E., et al., "Influence Of The Spatial Shape Of Nonspherical Symmetric Dielectric Microparticles on Morphology Of Photonic Jets". Proceedings of SPIE, vol. 9680, (2015) pp. 1-5.
Geints, Yu E., et al., "Characteristics of Photonic Nanojets From Ordered Microassemblies of Dielectric Spheres". Quantum Electronics, vol. 46, No. 3, (2016), pp. 236-241.
Martin, Jérôme, et al., "Intense Bessel-Like Beams Arising From Pyramid-Shaped Microtips". Optical Society of America, Optical Letters, vol. 37, No. 7, Apr. 1, 2012, pp. 1274-1276.
Gients, Yu, E., et al., "Modeling Spatially Localized Photonic Nanojets From Phase Diffraction Gratings". Journal of Applied Physics, 119, 153101, (2016), 6 pages.
International Search Report and Written Opinion of the International Searching Authority for PCT/EP2017/076835, dated Jan. 23, 2018, 19 pages.
International Preliminary Report on Patentability for PCT/EP2017/076835 dated Apr. 23, 2019, 10 pages.
Valdivia-Valero, F. J., et al. "Optical forces on cylinders near subwavelength slits illuminated by a photonic nanojet." Optics Communications 294 (2013): 25 pages.
Kuang, C., et al., "Creating attoliter detection vol. by microsphere photonic nanojet and fluorescence depletion." Optics Communications 285, No. 4 (2012): 402-406 (5 pages).
Zhao, T., et al., "Nanofocusing Element Based on Subwavelength Optical Microcavity" Opto-Electronic Engineering, vol. 37 No. 4, Apr. 2010, pp. 147-150 (4 pages).
Neves, A. A. R., "Photonic nanojets in optical tweezers." Journal of Quantitative Spectroscopy and Radiative Transfer 162, Mar. 17, 2015, 20 pages.
Ghenuche, P., et al., "Photonic nanojet focusing for hollow-core photonic crystal fiber probes." Applied optics vol. 51, No. 36 (2012) pp. 8637-8640 (4 pages).
Geints, Y.E., et al., "Photonic jet shaping of mesoscale dielectric spherical particles: Resonant and non-resonant jet formation." Journal of Quantitative Spectroscopy and Radiative Transfer 126, Sep. 2013 pp. 44-49 (6 pages).

\* cited by examiner (c)

$\theta = 0°$  $\theta = 10°$ (a)        (b)

$\theta = 20°$ $\theta = 30°$ (c) (d)

(a)

(b)

8-shape

Rectangular (c)

103

(d)

104

DEVICE FOR FORMING A FIELD INTENSITY PATTERN IN THE NEAR ZONE, FROM INCIDENT ELECTROMAGNETIC WAVES

This application claims the benefit, under 35 U.S.C. § 365 of International Application PCT/EP2017/057,129, filed Mar. 24, 2017, which was published in accordance with PCT Article 21(2) on Sep. 28, 2017, in English and which further claims the benefit of priority application EP16305343.2, filed on Mar. 24, 2016.

1. FIELD OF THE INVENTION

The present disclosure relates generally to techniques for forming field intensity patterns from electromagnetic waves, among which visible light. More particularly, but not exclusively, the present disclosure relates to techniques for near-field focusing and beam forming in the near zone. By near zone, it is meant here, and throughout this document, a region around a device according to the present disclosure, whose dimensions can extend from a fraction of the wavelength to about ten wavelengths in the host medium.

2. BACKGROUND

The focusing and collimation (i.e. beam forming (which can of course also be de-focusing)) of electromagnetic waves is an established way to increase locally the magnitude of the electric field and, in such a way, enhance efficiency of sensors, e.g. electro-optical sensors whose operational principles rely on the conversion of the energy propagating in space in the form of an electromagnetic wave into an output voltage or current. The latter sensors (for instance CMOS imaging sensors or photodiodes) are in the heart of almost every portable electronic device, from smartphones and tablets to professional light field cameras. The same phenomenon of local field enhancement is used in a variety of other applications in different wavelength ranges.

In the optical field, today level of technologies enables manufacturing of highly-integrated components (e.g. chips and optical sensors) with structural elements having nanoscale dimensions, which are close to or even smaller than the wavelength of visible light. The possibility of manipulating light with the same level of accuracy would be a great breakthrough compared to the state of the art.

However, the spatial resolution of conventional focusing devices, such as dielectric and metal-dielectric lenses, is limited by the Abbe diffraction limit and typically does not exceed one wavelength in the host media. At the same time, there are many applications which require, or can benefit from, a sub-wavelength resolution, as explained by A. Heifetez et al. in "Photonic nanojets", *J. Comput. Theo. Nanosci.*, vol. 6, pp. 1979-1992, 2009. This explains a growing interest for focusing components enabling a sub-wavelength resolution.

Another critical challenge associated with the today mobile and wearable technologies consists in the need for further miniaturization of the associated devices. The operational principles of the conventional lenses prevent reduction of their dimensions beyond a certain limit (~10 wavelengths) that constitutes a bottleneck for the future advances in the field. In particular, such a constraint may concern the packaging density of light detectors and may thus handicap further improvement of the image resolution.

Finally, the operational principles of the conventional lenses require a certain refractive index ratio between the lens and host medium materials. The higher the index ratio, the higher the lens focusing power that can be achieved. Because of this, in most cases the lenses are separated by air gaps, which require additional space and cause certain difficulties with lens fixation in space and alignment. Fully integrated systems can help avoid these problems. However, combination of several dielectric materials with different refractive indexes is rather difficult and not always feasible because of both the technological difficulties and the limited range of the refractive index variation for the optically transparent materials (typical index value in the optical range is n<2).

There is thus a need for new focusing components, which would overcome these drawbacks.

However, at present, the most popular focusing elements remain convex dielectric lenses introduced long ago, as shown in FIG. 1A. Such a lens can effectively focus light in a tight focal spot FS located at a certain distance FL from the lens surface, provided the lens has sufficient aperture size and its profile shape is properly defined with respect to the refractive indexes of the lens material and host medium. The operational principle of the refractive dielectric lenses is based on Snell's law, which predicts the tilt (refraction) of optical rays at the air-dielectric boundary of the lens due to the different phase velocity in the two media. To enable the desired focusing function, the lens must have an aperture size of at least a few wavelengths in the host medium, with a typical physical size varying from a few microns in case of microlenses to several centimeters in case of camera objective lenses. Their resolution is limited by the Abbe diffraction limit and is typically larger than one wavelength in the host media.

There also exist Fresnel-type diffractive lenses, whose operational principles rely on the interference of the waves diffracted by multiple concentric rings, as illustrated by FIG. 1B. If compared to refractive lenses of FIG. 1A, such lenses have smaller thickness, however, they usually suffer from strong chromatic aberrations. Their resolution is limited by the diffraction limit, like refractive lenses.

As already mentioned above, the spatial resolution of far-field focusing systems (e.g. refractive and diffractive lenses) is limited by the Abbe diffraction limit set by $\sim\lambda/2n \sin\alpha$, where $\lambda$ is the vacuum wavelength, n is the host media refractive index, and $\alpha$ is the half aperture angle of the lens (by far-field focusing systems, it is meant here systems which create focal spots FS at distances larger than a few wavelengths, i.e. in the far zone). Thus, a higher resolution can be achieved either by increasing the lens aperture size or by reducing the focusing distance FL. The latter explains the growing interest in near-field focusing systems, which create focal spots FS in the near zone. This interest is also strongly supported by the growing number of applications across different domains, which require near-field light processing with the highest possible resolution, such as for example in microscopy, spectroscopy or metrology.

At present, there are several near-field focusing techniques available, based on subwavelength aperture probes (L. Novotny et al., "*Near-field optical microscopy and spectroscopy with pointed probes*", Annu. Rev. Phys. Chem. Vol. 57, pp. 303-331, 2006), planar subwavelength-patterned structures (U.S. Pat. No. 8,003,965), and photonic nanojet microsphere dielectric lenses. The latter solution (i.e. nanojet microspheres), as described for example in U.S. Pat. No. 7,394,535, and illustrated in FIG. 1C, is often referred to as the most effective one because microspheres can simultaneously provide the subwavelength resolution and a high level of field intensity enhancement (FIE). As shown on FIG. 1C, they allow generating a nanojet beam NB. This photonic nanojet is an optical intensity pattern induced at a shadow-side surface of a dielectric microsphere. Patent document US 2013/0308127 also describes nanojet devices, allowing to enhance Raman emissions from a sample by using a microsphere to confine the impinging radiation into a photonic nanojet and thereby increase the intensity of the radiation that is striking the sample. The amount of enhancement may be improved by configuring the diameter and refractive index of the microspheres in conjunction with the dispersion and the wavelength of the radiation to increase the intensity of the beam of radiation in the photonic nanojet.

Despite their attractive performance characteristics, the use of microspheres is associated with certain difficulties related to their (i) precise positioning, (ii) integration with other optical components, and (iii) non-compatibility with the established planar fabrication techniques. These difficulties affect feasibility and increase the fabrication and assembly costs of the nanojet based devices. Potentially, the assembly problem can be solved using nanoscale patterned structures or hollow tubing, but these solutions may not be compatible with some applications.

An alternative solution for nanojet microsphere lenses was proposed recently based on the solid dielectric cuboids (SDC). As demonstrated by V. Pacheco-Pena et al. in "*Terajets produced by dielectric cuboids*", *Applied Phys. Lett.* Vol. 105, 084102, 2014, and illustrated by FIG. 1D, when illuminated by a plane wave, the SDC lenses can also produce condensed beams TB, similar to the nanojet beams observed for microspheres, with subwavelength dimensions, provided the size and shape of cuboids is properly adjusted with respect to the incident wavelength and the refractive index of the cuboid material. The best spatial resolution ($\sim\lambda/2$, where $\lambda$ is the wavelength in the host medium) and field intensity enhancement (factor of ~10) is achieved for SDC with dimensions of about one wavelength in the host medium and the refractive index ratio $n_2/n_1 \sim 1.5$, where $n_1$ and $n_2$ are refractive indexes of the host medium and cuboid material, respectively.

Although the rectangular shape of SDC lenses can be advantageous for some planar fabrication methods (e.g. micromachining or lithography), the fabrication of SDC lenses operating in the optical range can be difficult or even impossible because of the following constraints:

Strict requirements imposed on the cuboid size and shape,
Absence of materials with the desired refractive indexes (in the optical range, the refractive index of common optical glass and plastics, which can be used as a host medium, varies from $n_1 \approx 1.3$ up to 2.0, whereas, according to V. Pacheco-Pena et al, the desired value of the cuboid lens refractive index should be $n_2 \sim 2.25$ (suggested ratio $n_1/n_2=1.5$ with $n_1 \approx 1.5$ for a standard glass) that is out of range for standard optical materials.
No solution provided for setting the position of such lenses in space is provided.

Last, it is worth mentioning one more alternative solution for the near-field enhancement available in the optical range. This solution is based on the phenomenon known as surface plasmon polaritons (SPP). The SPP phenomenon enables one to create subwavelength hot spots with a very high field intensity. In particular, SPP-based components find application in color filtering and display technologies, as described by Y. Gu et al. in "*Plasmonic structures color generation via subwavelength plasmonic nanostructures*", *J. Nanoscale*, vol. 7, pp. 6409-6419, 2015. However, the SPP fields are tightly coupled to the metal and decay exponentially away from the surface, which prevents the use of SPP devices for the optical systems requiring a 'long-range communication' or far-field beam forming. Moreover, the SPP can only be excited under specific conditions that include:

certain material properties of the metals (i.e. negative real part of the relative permittivity that is only intrinsic to some noble metals in the visible light spectrum),
normal E-field component in the incident field,
use of a SPP launcher (e.g. dielectric prism or grating).
These constraints are not always acceptable.

All prior art focusing methods and components thus suffer from certain limitations and do not fully satisfy the needs of the today and future micro and nanotechnologies. Some limitations, intrinsic to all (or at least some) of the available focusing devices, are associated with:

the physical dimensions of the components,
a limited spatial resolution,
a limited choice of dielectric materials (limited refractive index variation range),
some fabrication/integration difficulties,
certain limitations in the performance characteristics of the devices (e.g. chromatic aberrations and/or polarization sensitive response) linked to their operational principles.

It would hence be desirable to provide a new technique for forming field intensity patterns in the near zone from electromagnetic waves, and notably for generating condensed low-dispersive beams of radiation in the near zone, which would not present at least some of these drawbacks.

3. SUMMARY

In one aspect, a device for forming a field intensity distribution in the near zone, from electromagnetic waves which are incident on said device, is disclosed. Such a device comprises at least one layer of dielectric material; a surface of said at least one layer of dielectric material has at least one abrupt change of level forming a step, and at least a lower and lateral part of said surface with respect to said step is in contact with a substance having a refractive index lower than that of said dielectric material.

The present disclosure thus provides a new generation of components, allowing to form desired field intensity distribution in the near zone, with the aid of purely dielectric microstructures. Such devices may notably be used for focusing electromagnetic waves, and for generating condensed low-dispersive optical beams (so-called nanojets) in the near zone from a plane electromagnetic wave incident on the device (notably, but not exclusively, from the bottom part of the dielectric layer, which surface can be even). When used in a reverse mode, they may also be used for correcting a non-planar wave front of an electromagnetic wave generated by a source of electromagnetic radiation or by another beam-forming element, located close to the top part of the dielectric layer, which surface has an abrupt change of level. In particular, such a correction can include transformation of a non-planar wave front (typical for beams and spherical waves) into a locally planar wave front or beam, or another shaped wavefront.

In other words, when used at optical wavelengths, such a device may produce at least one condensed optical beam in the near zone (i.e. a nanojet beam), thus creating at least one high-intensity focal spot in an imaging plane, which is defined in the near zone of the device. The use of such a device is of course not limited to such wavelengths.

As will be described in greater detail in the following part of the present disclosure, such spots have shapes, which are typically circular or oval, more or less elongated. The shape of the spots is defined here by the shape of a contour line surrounding the area with field intensity equal to half of the maximum intensity in the corresponding hot spot. Spots may also have a more complex shape if more than one concave segment of the step contributed in the formation of a single spot. Their smallest size is circa half of the wavelength in diameter, when defined at half power, which is close to the Abbe diffraction limit.

When a pattern of several spots is formed, the spacing between the spots should be of at least one wavelength, otherwise two spots could merge forming a common hot spot of complex shape.

The field intensity enhancement (compared to a plane wave propagating in the same host medium) associated to such spots varies from a factor of two, for a step with a straight boundary, to a factor of ten, or even up to twenty for more complex shapes of steps.

The abrupt change of level in the surface induces a step of index for an incident electromagnetic wave, which reaches the device in the vicinity of the step in the dielectric layer. Such a step of index gives birth to a complex electromagnetic phenomenon, which will be described in greater detail in relations to the figures in the foregoing disclosure. Such a complex electromagnetic phenomenon, which involves diffraction of the incident wave on the lower part of the edge with respect to the step, coupled to refraction of the diffracted wave on the lateral part of the step allows producing condensed beams and thus different field patterns in an imaging plane located in the near zone, depending on the features of the step, and on the difference of refractive indexes between the dielectric material and the substance covering its lower and lateral surfaces. The apparition of the nanojet beam results from the interference of diffracted/refracted wave and the incident plane wave.

The substance in contact with the lower and lateral surfaces of the step may simply be air, another gas, vacuum, a liquid or any other material with a refractive index lower than that of the dielectric material. It must also be noted that the lateral part of the step need not necessarily be vertical, and may show an angle with respect to the normal to the surface of the dielectric layer. Moreover, it may not necessarily be a straight-line segment.

There is no restriction on the bottom surface of the dielectric layer, which may be plane, or not. The dielectric layer may notably be flexible.

Such a device according to embodiments of the present disclosure thus allows generating low-dispersive beam(s) in the near zone. Such a function may be controlled by appropriately choosing an appropriate refractive index ratio for the materials of the dielectric layer and the substance/element, the step's edge line length and curvature, as well as its base angle, as will become more apparent while reading the following.

According to an embodiment of the present disclosure, said step is formed by an edge of at least one cavity made in said at least one layer of dielectric material.

Hence, as compared to a single step in the layer of dielectric material, all the edges of the cavity may contribute to generating a field intensity distribution in the near zone, notably producing (i.e. giving rise to) at least one condensed beam of radiation. Depending on the shape of the cavity cross-section, it is possible to produce different field patterns obtained from a combination of the beams generated by the cavities.

According to another embodiment, said at least one cavity is a through-hole in said at least one layer of dielectric material. The height of the cavity(ies) thus corresponds to the thickness of the dielectric layer. In case the cavity is not a through-hole, its height is hence smaller than the thickness of the dielectric layer; it may be located at any position with respect to the top and bottom surfaces of the dielectric layer. The cavities need not be all the same ones.

According to another embodiment, said at least one cavity belongs to at least one set of at least two cavities.

Cavities may be arranged into arrays of cavities, or non-regular arrangements forming a peculiar pattern, in order to generate specific focused beams in the near zone, or an array of beams, which may be of interest for some applications, like optical sensors. An array of two or more closely positioned cavities can be used in order to provide control over the field distribution in a larger area and/or to increase field intensity at some selected point(s). Moreover, the arrays of cavities may be planar (with all base faces of all cavities laying in the same plane) or not, and can be made of identical cavities or not.

According to yet another embodiment, said at least one cavity is targeted to be cylindrical or cone-shaped.

By cylindrical cavity, it is meant here, and throughout this document, a cavity is a shape is a generalized cylinder, i.e. a surface created by projecting a closed two-dimensional curve along an axis intersecting the plane of the curve. In other words, such a cylinder is not limited to a right circular cylinder but covers any type of cylinder, notably, but not exclusively, a cuboid or a prism for example. The cavity may also have the form of a cone. Its main axis may be orthogonal to the surface of the bottom of the cavity, or be tilted. Due to the fabrication tolerances, the cavities may also have imperfect shapes, and it must be understood, for example, that cavities targeted to be shaped as cylinders, may become cone-shaped cavities with S-shape cross-sections during the manufacturing process.

More generally, such cavities are formed as cylinders or cones with an arbitrary cross-section, which can be adapted (optimized) in order to produce a desired near-field pattern, i.e. a desired field intensity distribution in the xy-plane (typically orthogonal to the incident wave propagation direction). This pattern may have one or multiple hot spots with identical (or different) field intensity level.

Non-symmetric cavities are also possible. For example, a cavity which cross-section in the xy-plane is triangular will create three spots. One of them can be enhanced if the corresponding face is concave, as will be explained in greater detail in relation to the figures.

According to an embodiment, a height H of said step, or of said cavity, is targeted to be such that $$H > \frac{\lambda_1}{2},$$

where $\lambda_1$ is a wavelength of said electromagnetic waves in said dielectric material. Actually, the nanojet phenomenon is well pronounced for a cavity height varying from about half to a few wavelengths in the host medium (dielectric material). A minimum height is needed to form a locally planar wave front, which will give rise to the nanojet beam.

Moreover, the nanojet beam appears at the bottom of the cavity. As in most applications it is desired to have a beam, which extends beyond the height of the cavity, the height of the cavity should be smaller than the length of the generated nanojet beam, which is generally about two to five (in some cases ten or even more) wavelengths.

According to an embodiment, such a device also comprises at least one layer forming a substrate abutting said layer of dielectric material.

Such a substrate may contribute to the mechanical rigidity of the device.

According to a further embodiment, such a device also comprises at least one layer forming a superstrate, said at least one layer of dielectric material being located between said substrate and said superstrate.

Hence, the device may take the form of a planar optically-transparent element, comprising two glass or plastic plates (namely the substrate and the superstrate), between which a dielectric material with void or filled hollow microcavities is embedded. The superstrate may of course be non-planar, and follow the shape of the substrate for example. Actually, the pattern of the field intensity distribution generated by the device when illuminated by a plane wave incident normal to the base solely depends on the cavity base angle (or step angle), on the cavity cross-section shape, and on the index ratio between the dielectric material and the substance filling the cavity (or covering the lower part of the surface with respect to the step).

It must be noted that the radiation of the beams will change for incline incidence of the plane wave, with a shape of the beam well preserved for the incident angles of about +/−30°, depending on the index ratio, the size, base angle and curvature of the cavity edge line.

According to an embodiment, the substrate and the superstrate are made of the same dielectric material as said at least one layer of dielectric material.

According to an embodiment, said dielectric material belongs to the group comprising:
glass;
plastic;
a polymer material, such as PMMA (Poly(methyl methacrylate)) or PDMS (Polydimethylsiloxane). It must be noted that air is not considered as a candidate dielectric material for the device according to the present disclosure.

Such a device can hence be fabricated using standard dielectric materials, which are easy to find and inexpensive.

According to an embodiment, a material of said superstrate belongs to the group comprising:
glass;
plastic;
a polymer material.

In one embodiment of the disclosure, it is proposed a device for forming a field intensity distribution in the near zone, from propagating electromagnetic waves which are incident on said device. Such device comprises:
at least one layer of dielectric material, having a first refractive index $n_1$ with a surface having at least one abrupt change of level forming a step;
an element having a second refractive index $n_2$ lower than said first refractive index $n_1$, which is in contact with said step; and
said step generates a beam which is tilted compared to a propagation direction of said electromagnetic waves.

In a variant, the titled beam has a length that can vary from $\frac{1}{2}\lambda_1$ to several wavelengths, with $\lambda_1$ being a wavelength of said electromagnetic waves in said dielectric material.

In a variant, the device comprises a receiving element positioned along a propagation direction of said titled beam.

In a variant, the receiving element is positioned at a hot spot of said beam.

In a variant, the receiving element is positioned at a distance d from said step, where d is between one $\lambda_1$ to $10\lambda_1$, with $\lambda_1$ being a wavelength of said electromagnetic waves in said dielectric material.

In a variant, the titled beam is associated with an angle of radiation which is defined as a function of said first refractive index $n_1$ and/or said second refractive index $n_2$, and/or incident angles of said incident electromagnetic waves compared to said step, and/or a step base angle.

In a variant, the angle of radiation is around a value equal to $(90°-a\ \sin(n_2/n_1))/2$.

In a variant, the angle of radiation is around 23° when $n_1=1.49$ and $n_2=1$, and around 30°, when $n_1=2$ and $n_2=1$.

In a variant, the device is adapted to form beams for incident electromagnetic waves that are monochromatic electromagnetic waves, each of said monochromatic electromagnetic waves having a wavelength equal to a value which is around 480 nm or 525 nm or 650 nm.

4. BRIEF DESCRIPTION OF THE DRAWINGS

The present disclosure can be better understood with reference to the following description and drawings, given by way of example and not limiting the scope of protection, and in which.

Figure 5:
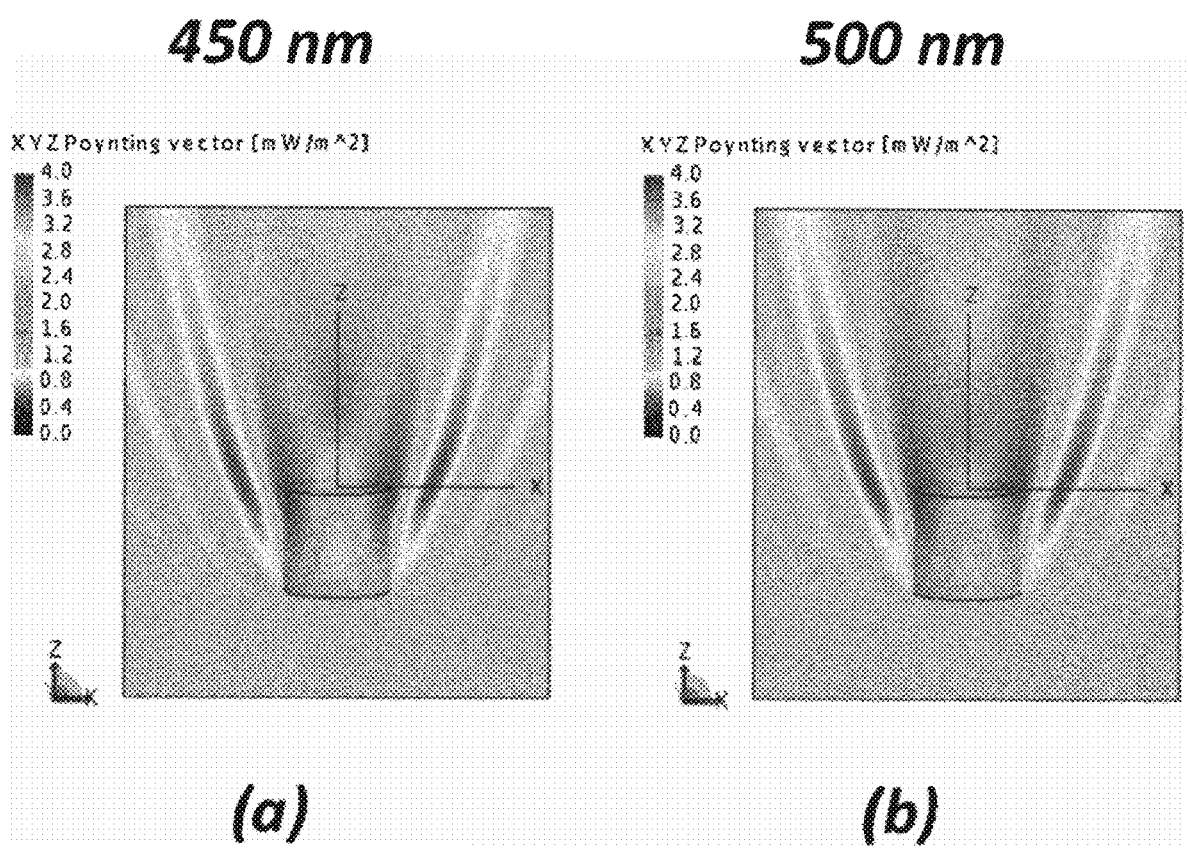
FIGS. 5a to 5e illustrate the formation of a nanojet beam by the cavity of FIG. 4 having a circular cylinder shape when illuminated by a plane wave from below at different wavelengths.
Figure 5:
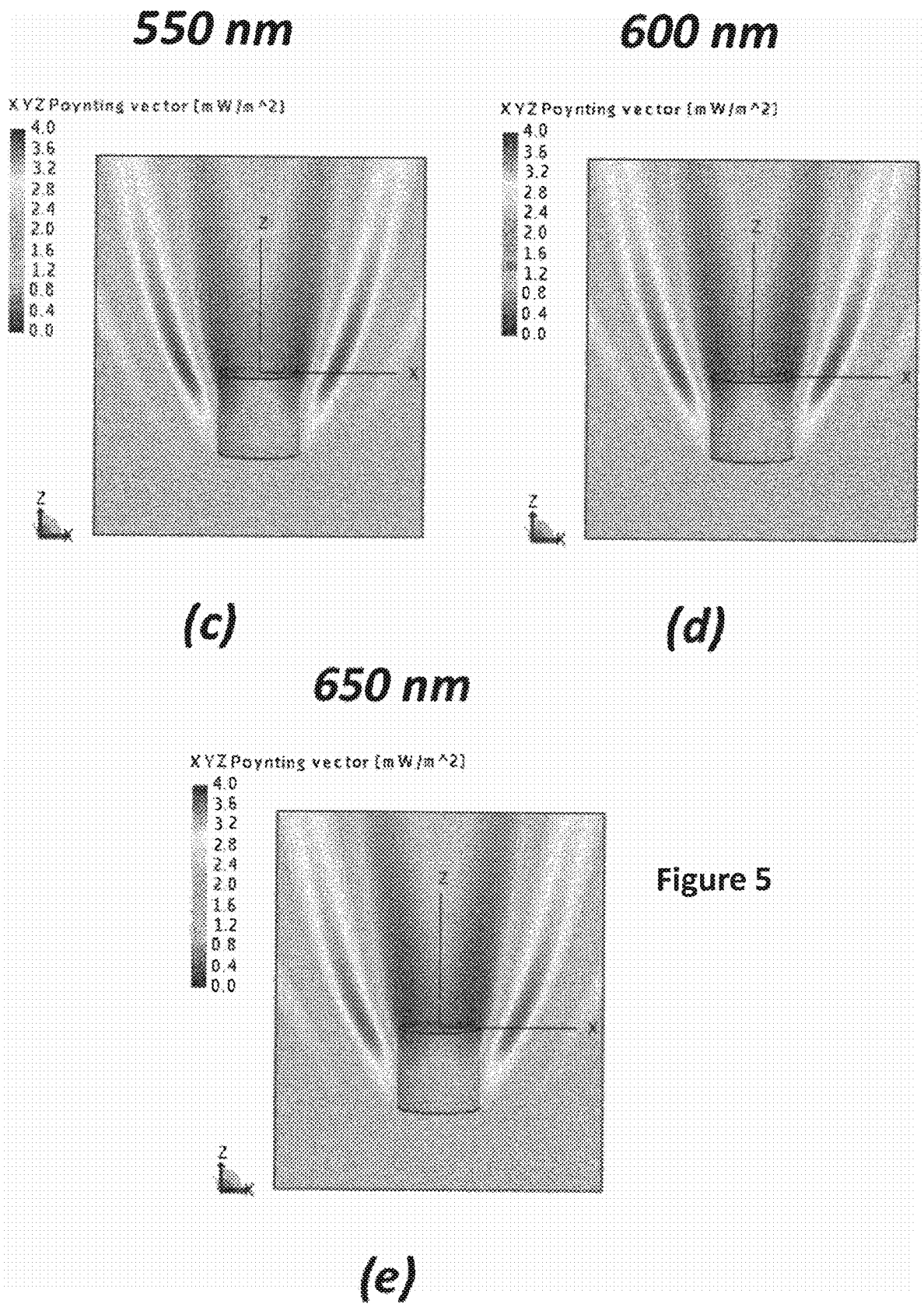
Figure 6A:
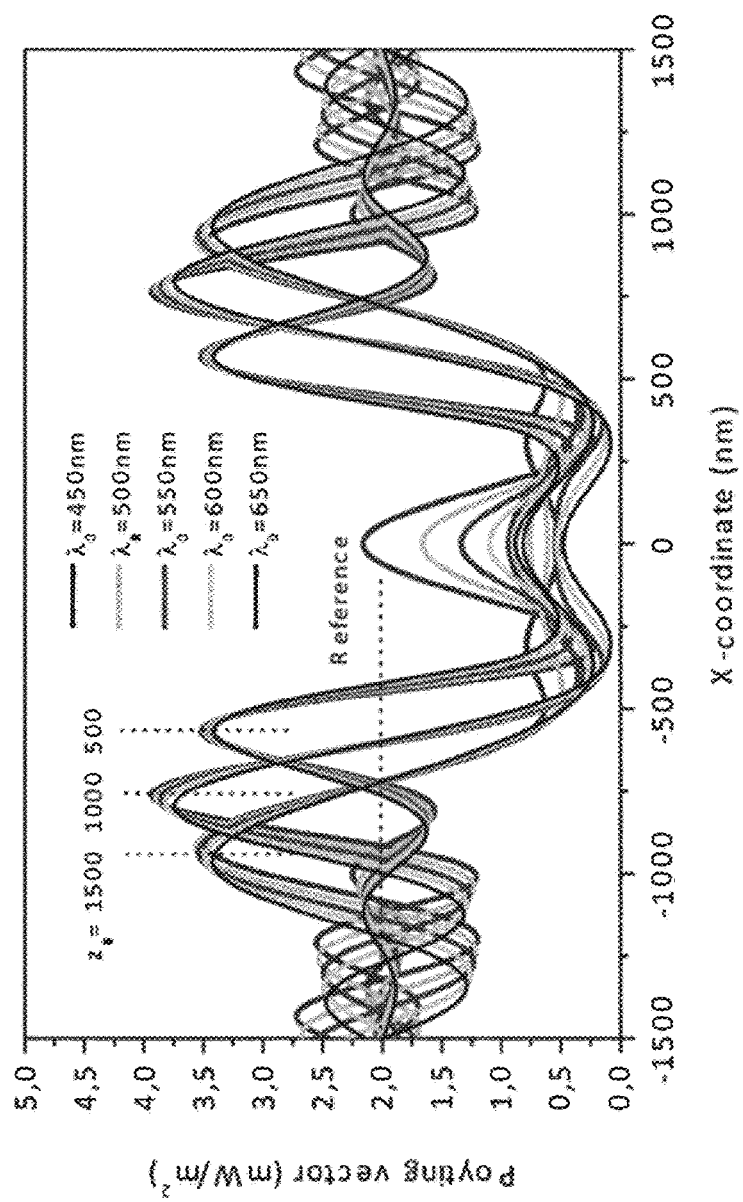
Figure 6B:
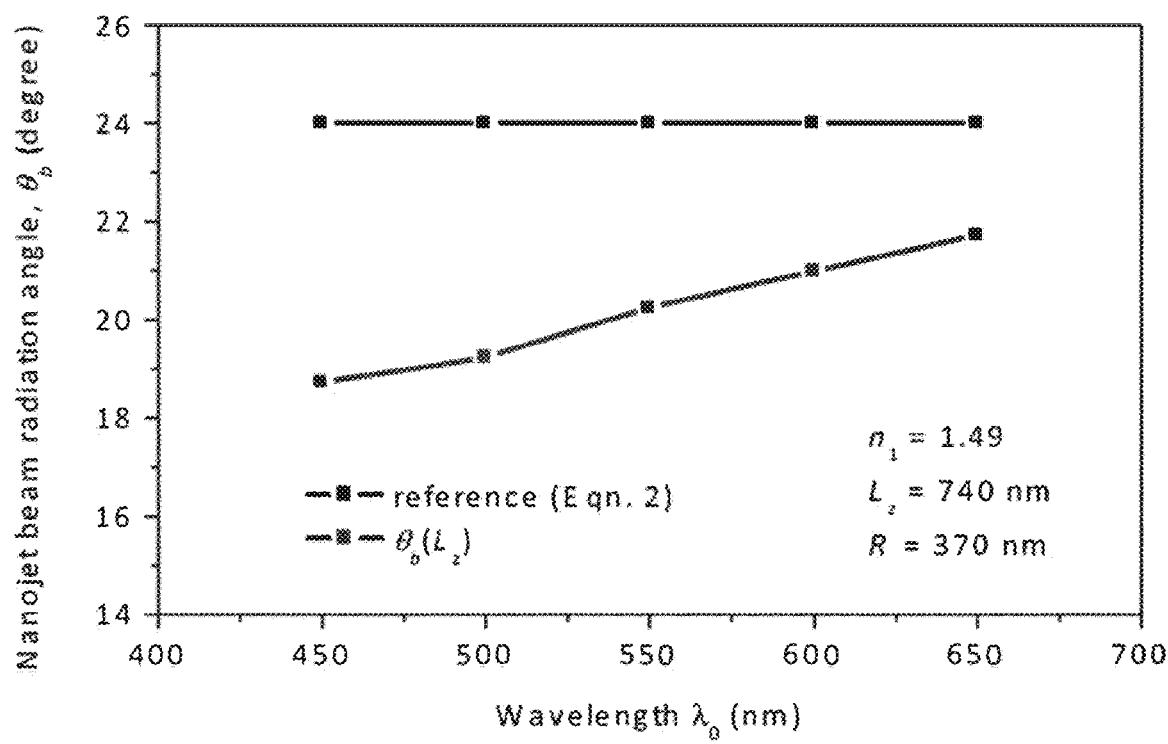
Figure 7A:
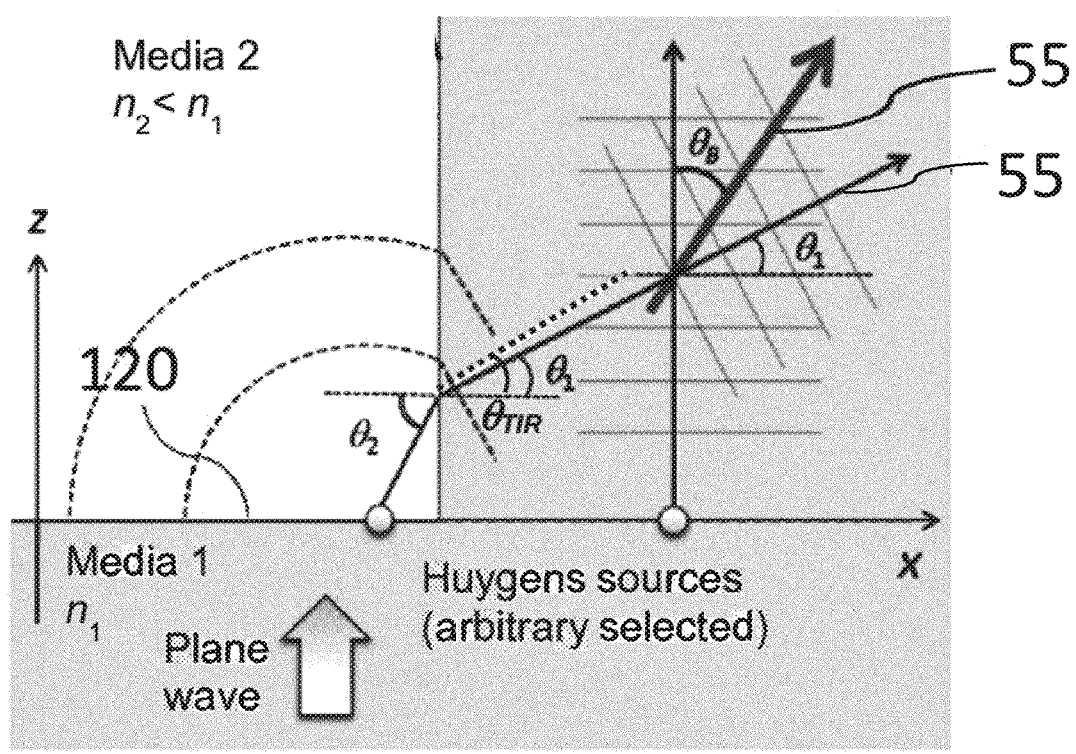
Figure 7B:
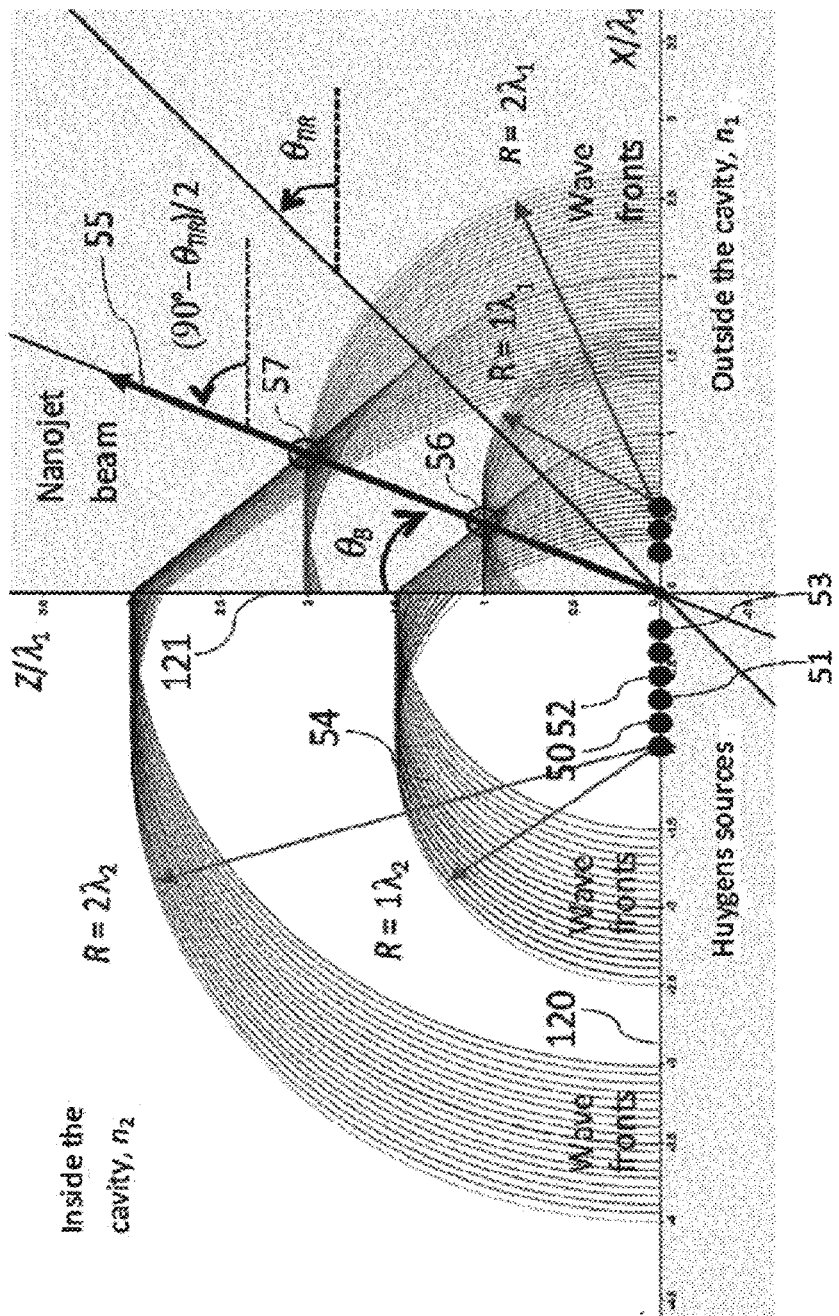
Figure 8:
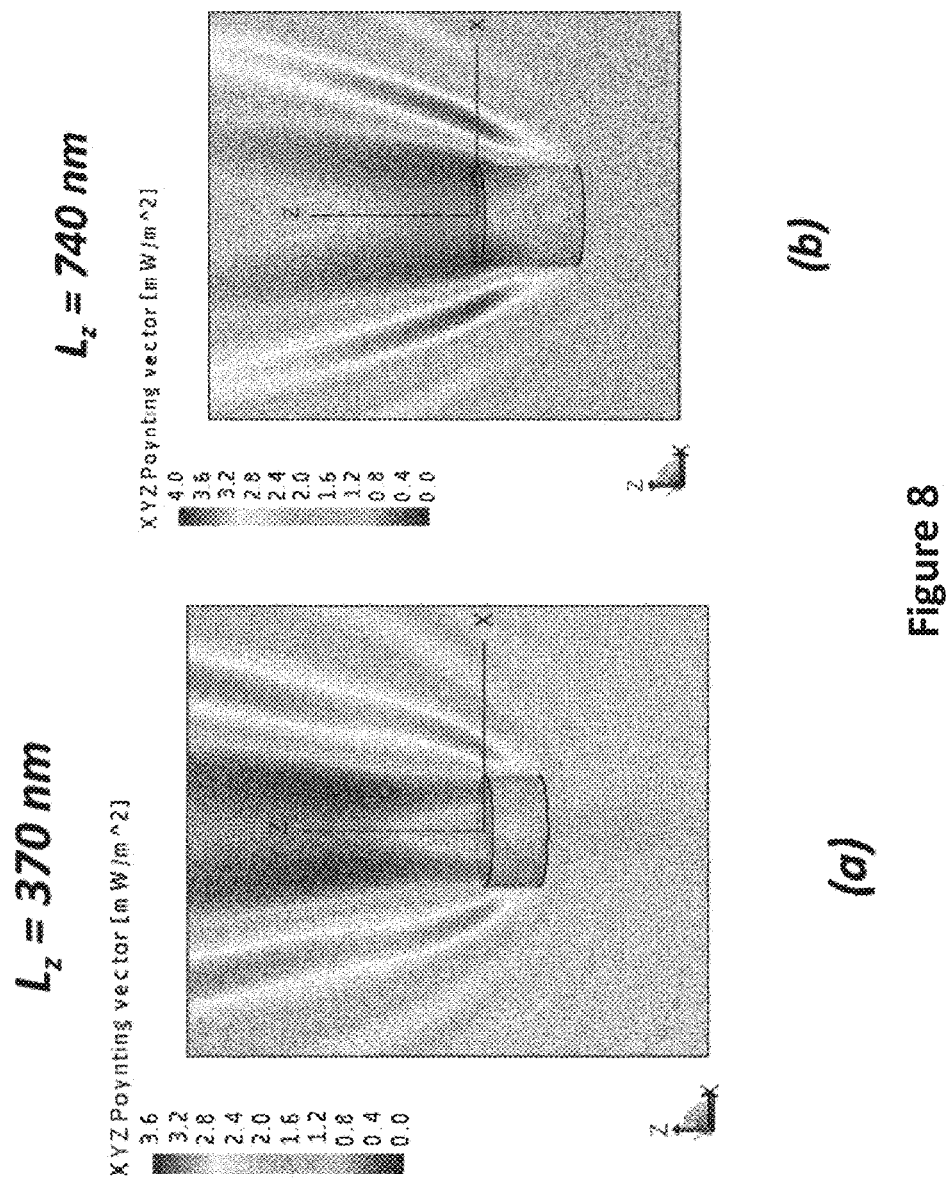
Figure 8:
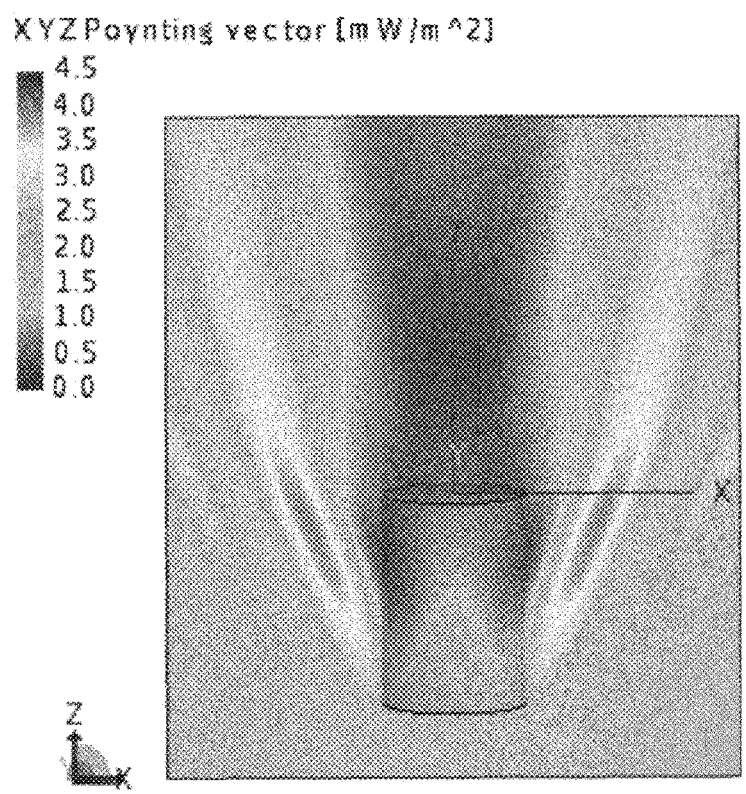
Figure 11:
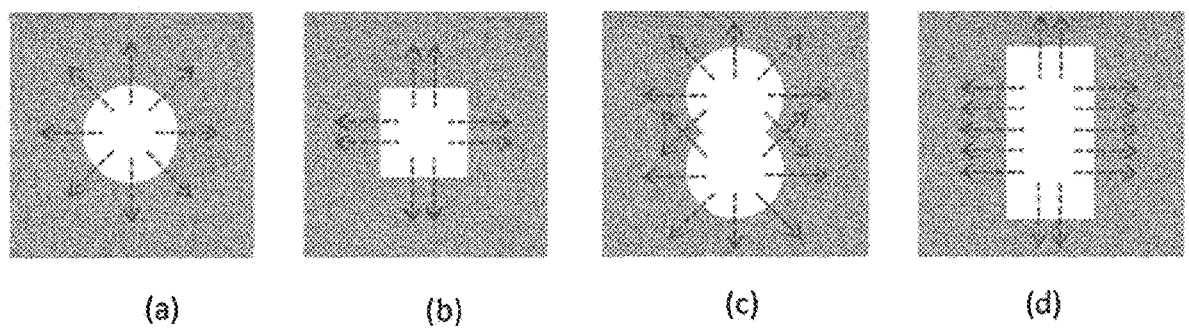
Figure 14:
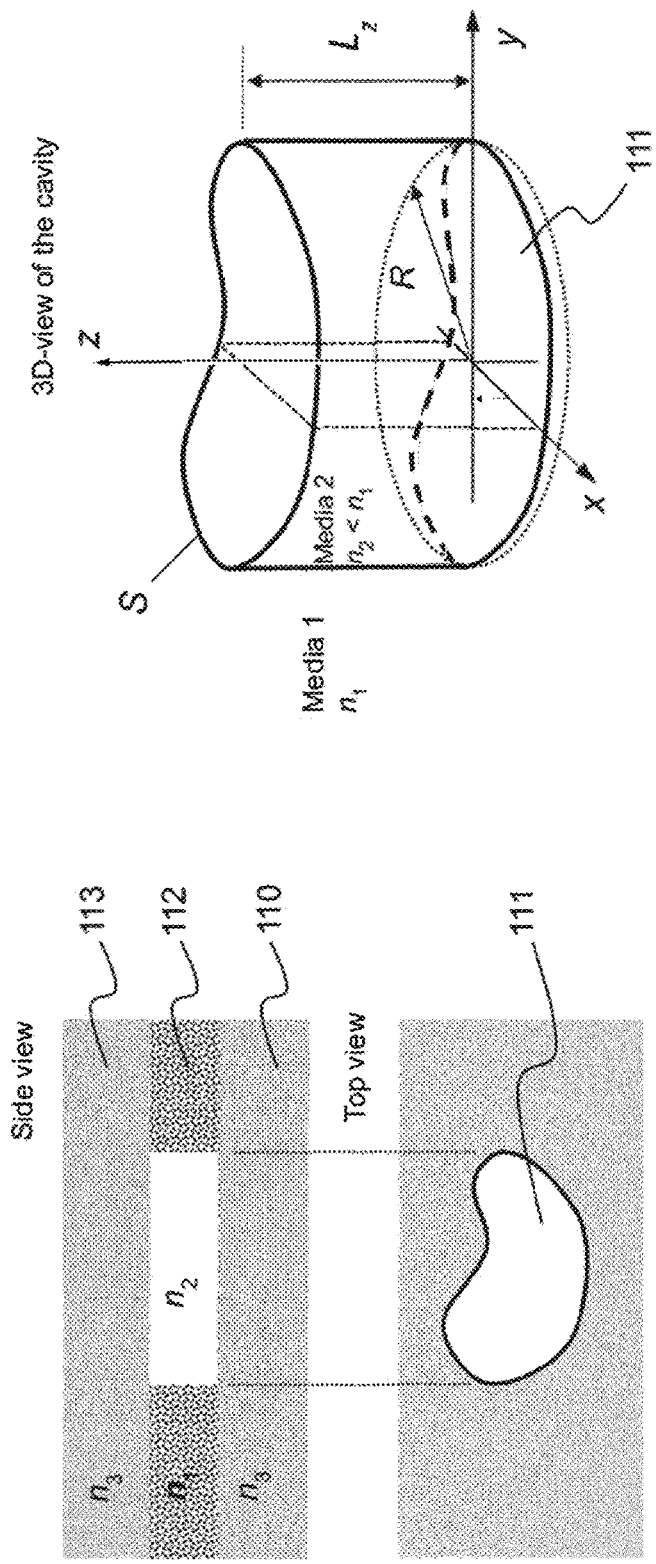
Figure 15:
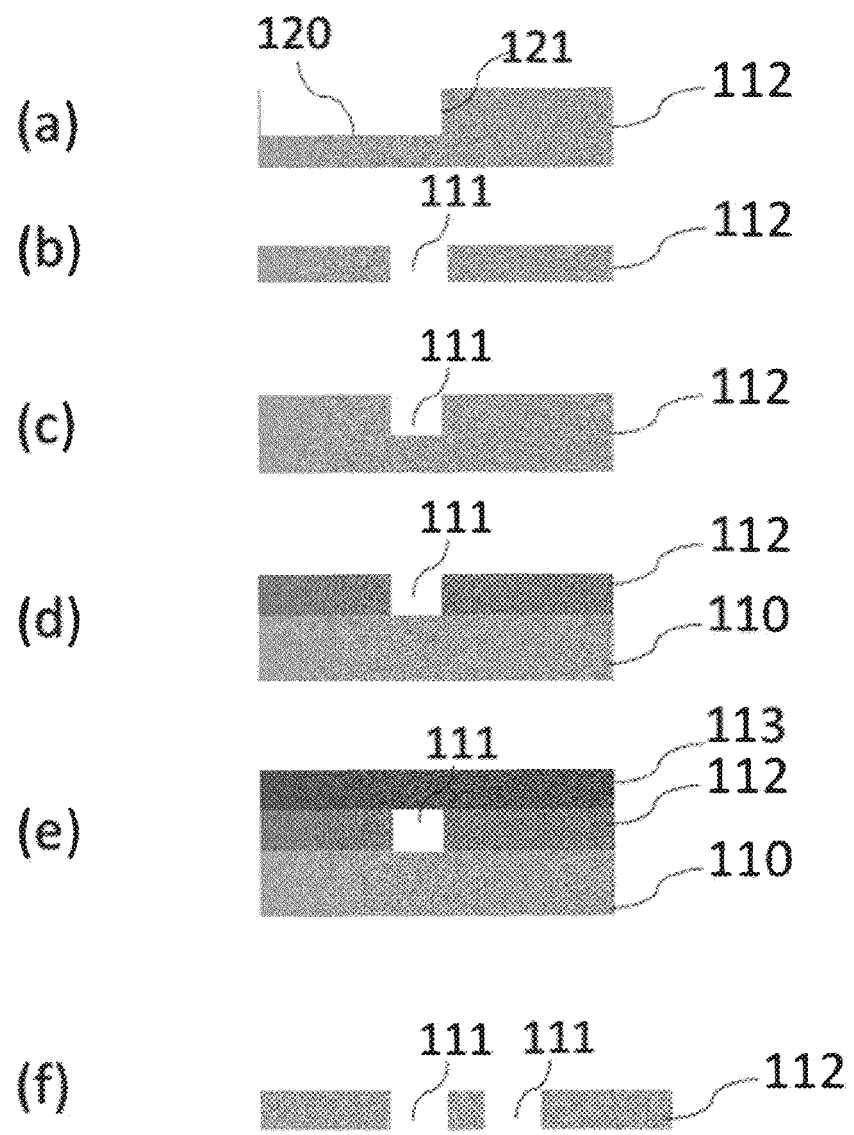
Figure 16:
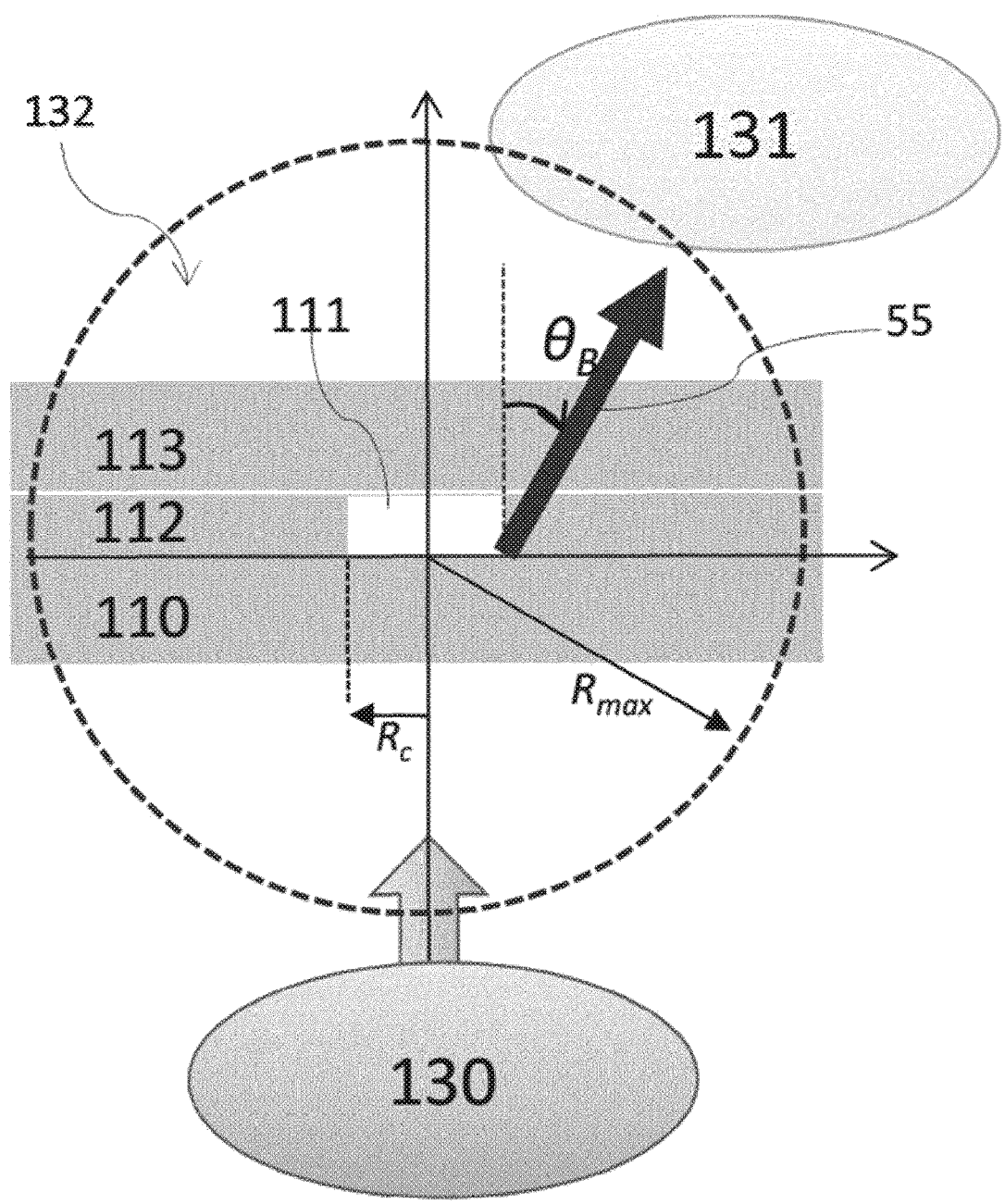
Figure 17:
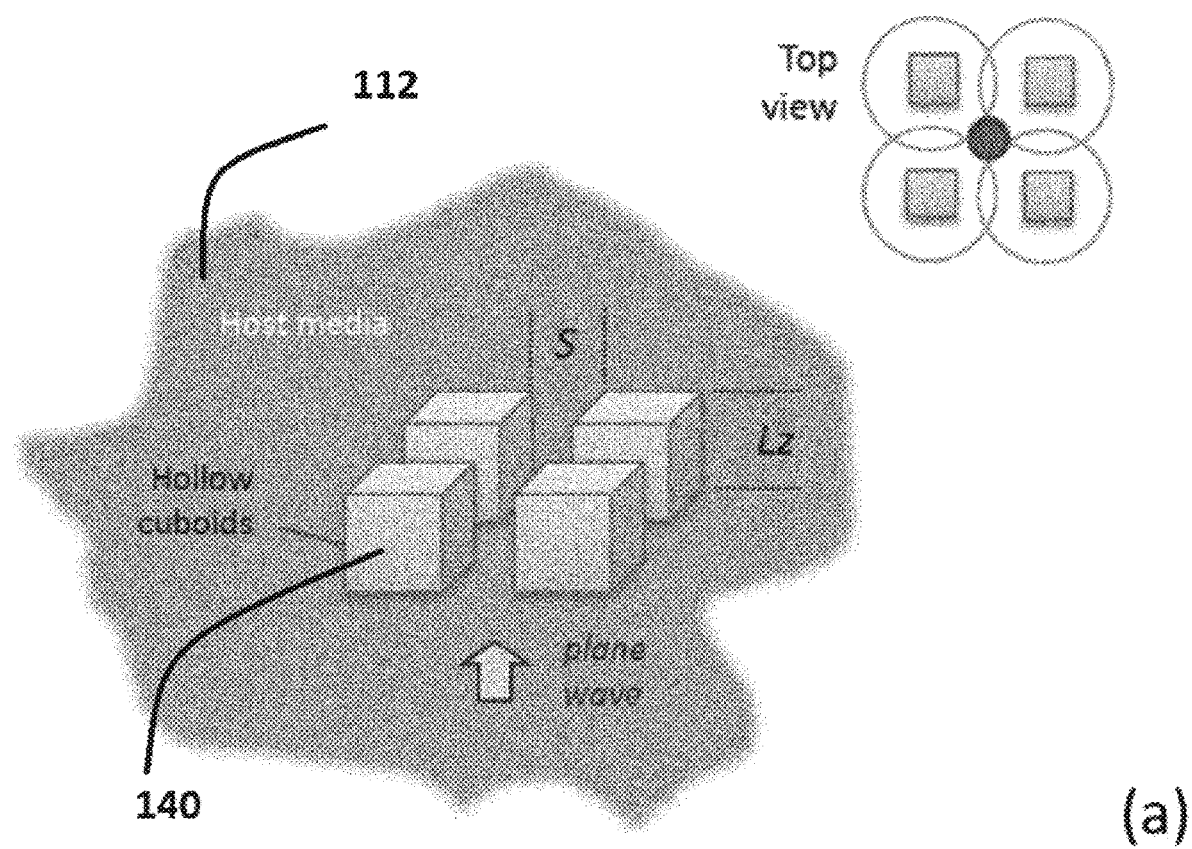
Figure 17:
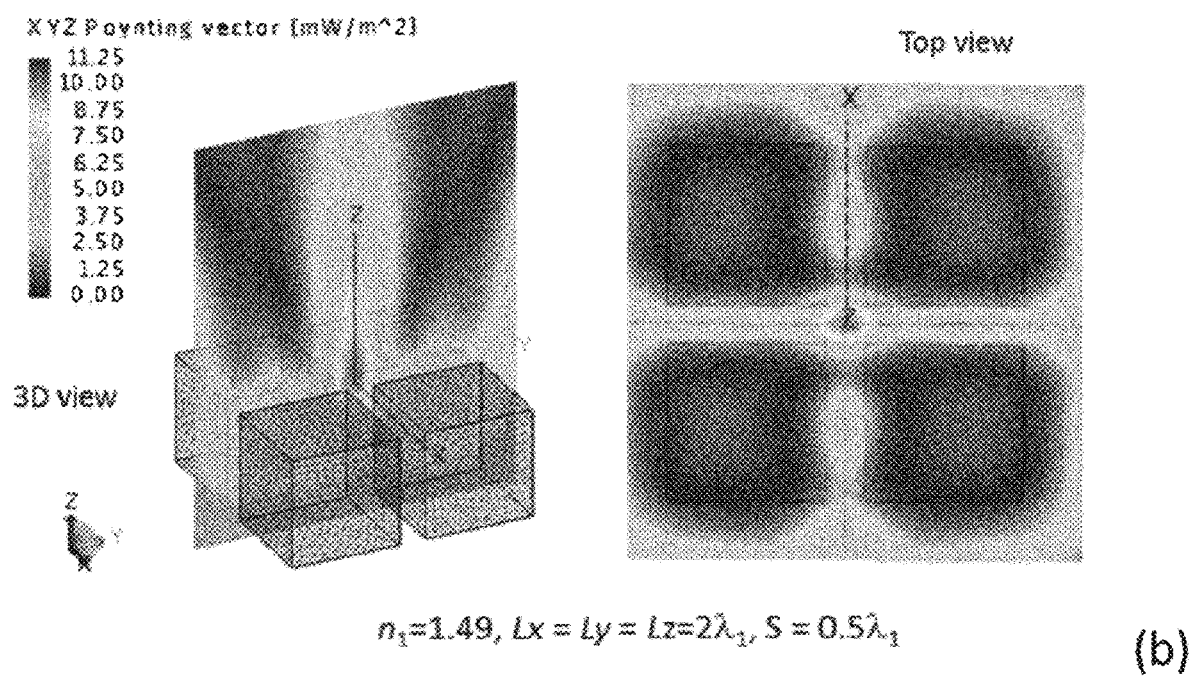
Figure 18:
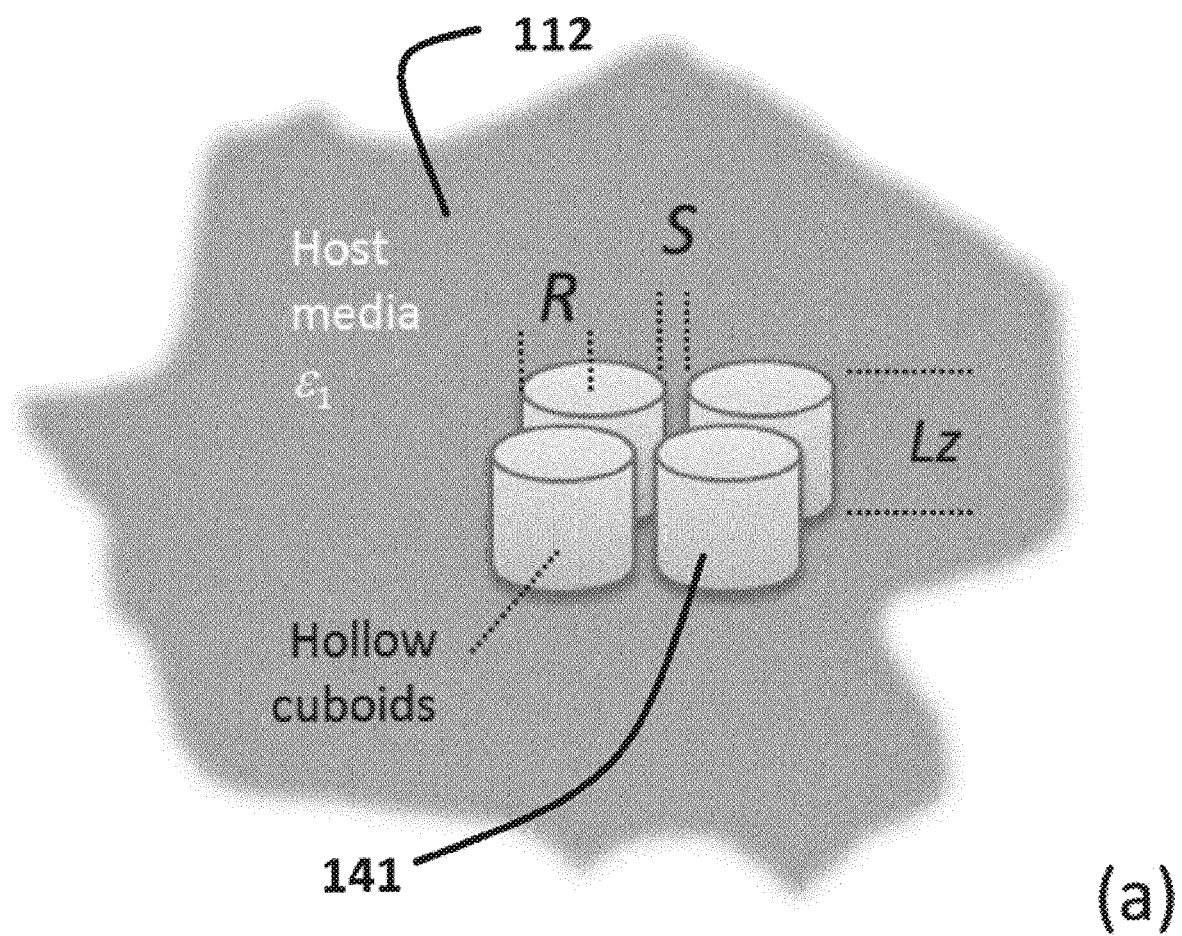
Figure 18:
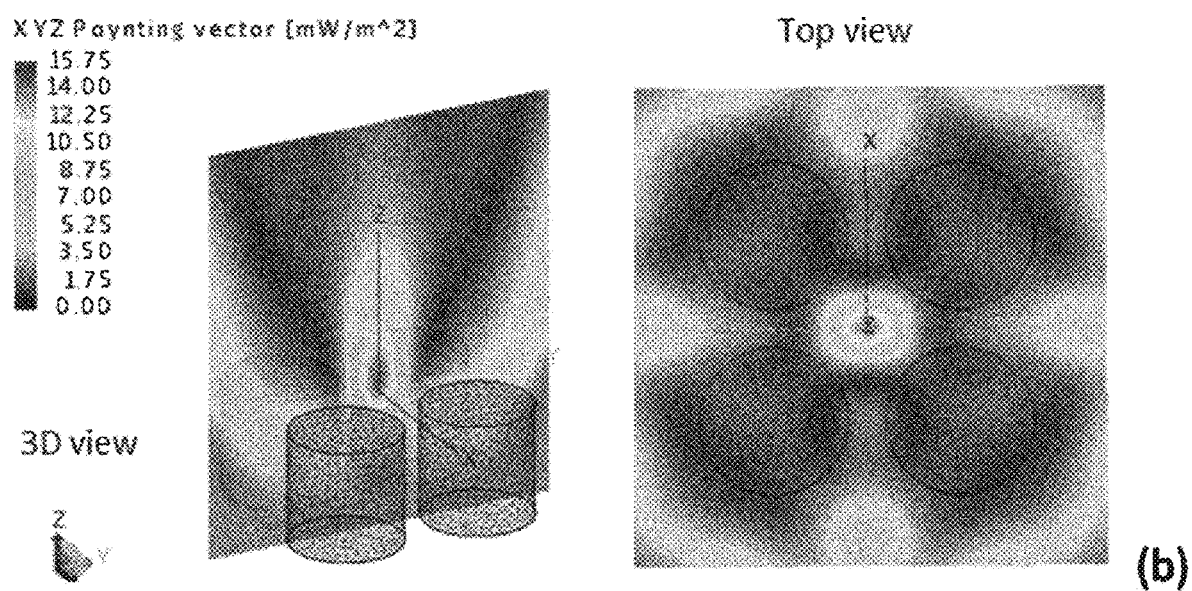
Figure 19:
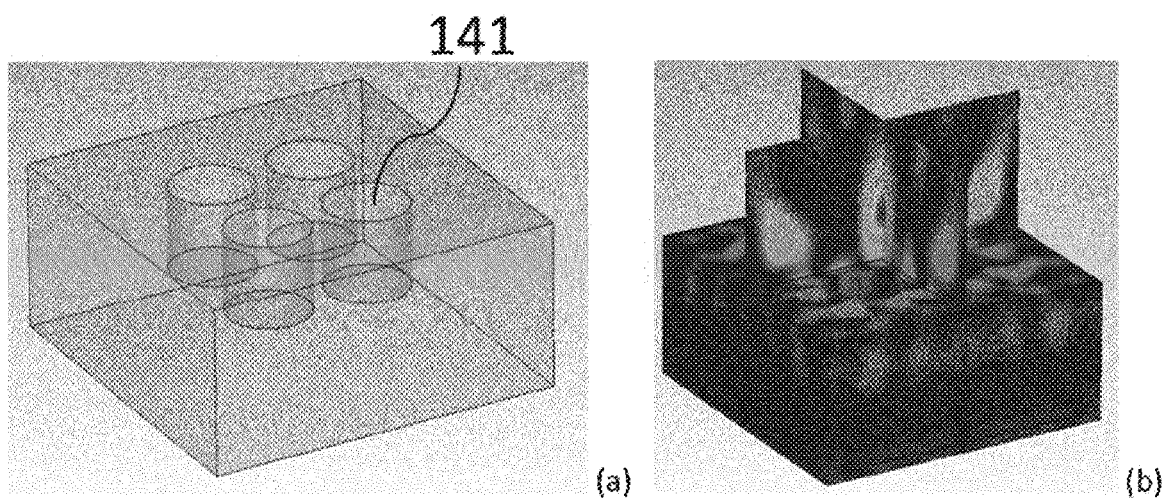
Figure 20:
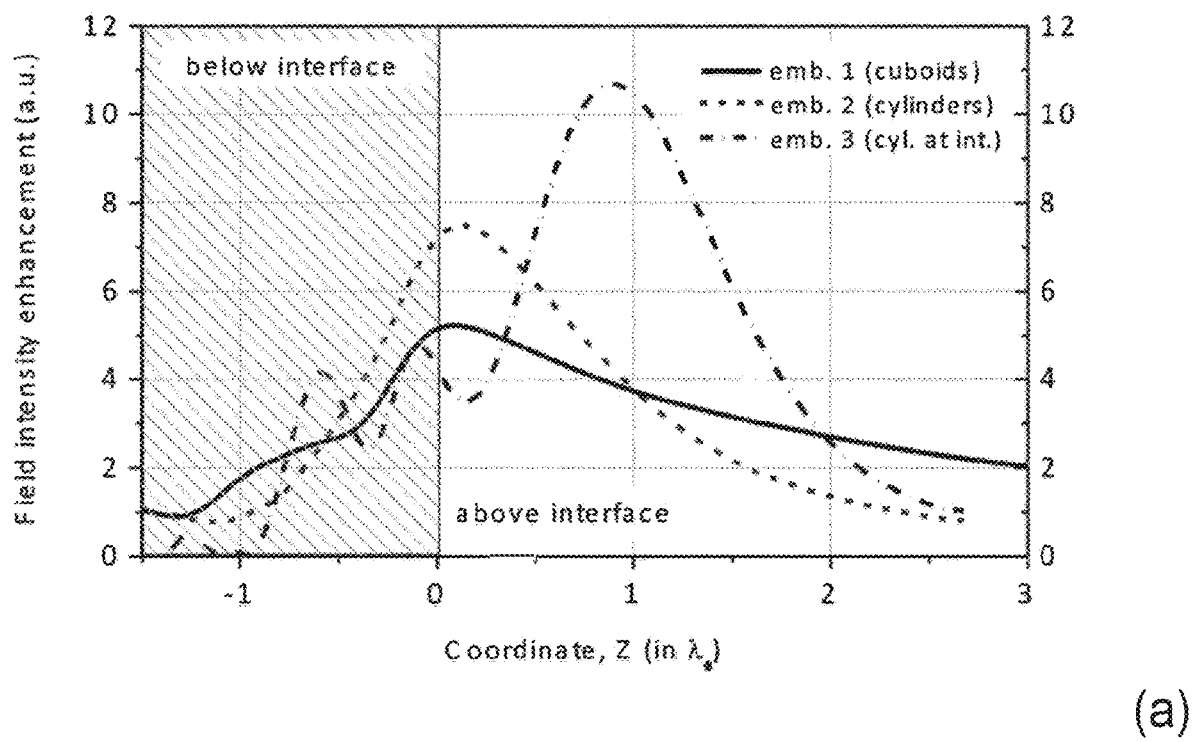
Figure 20:
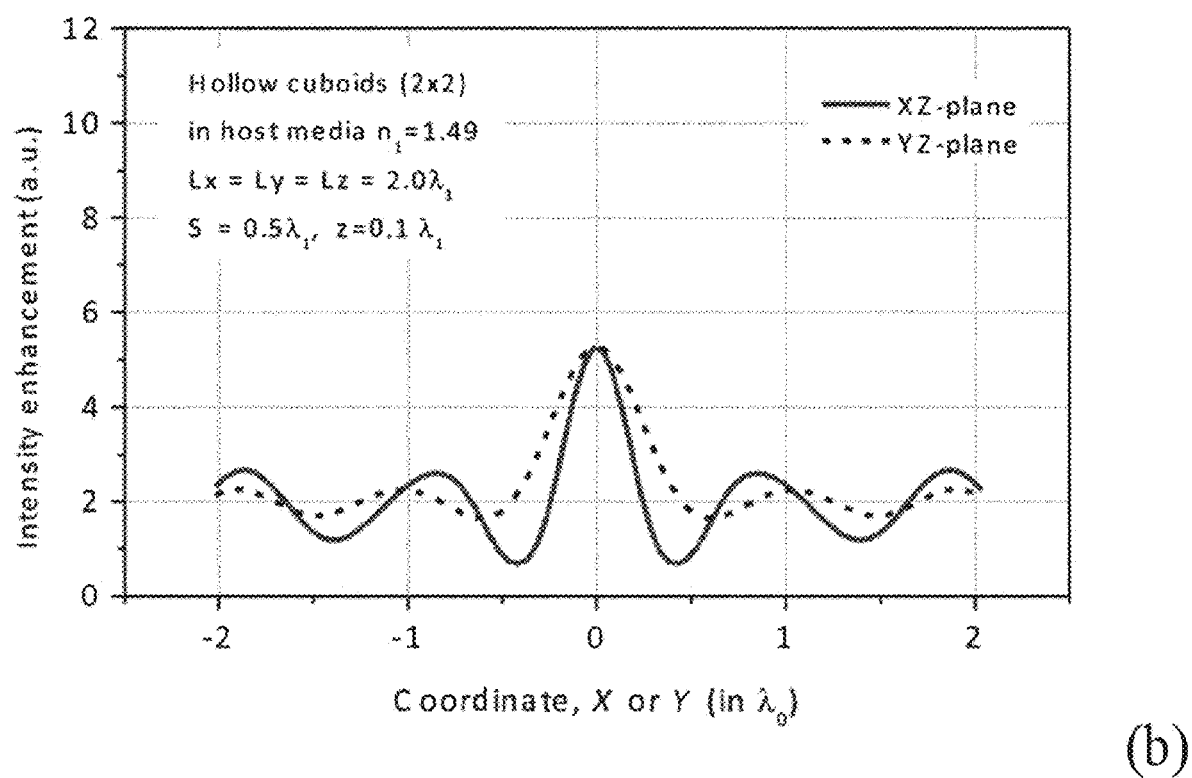
Figure 20:
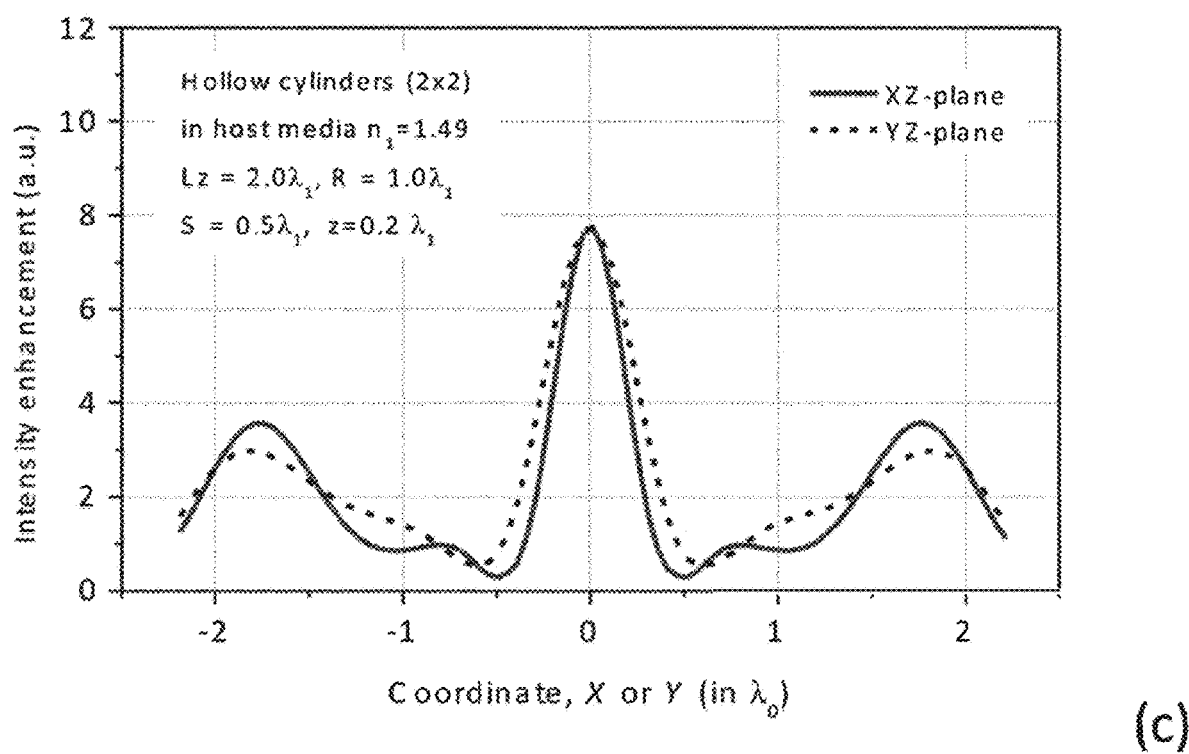
Figure 20:
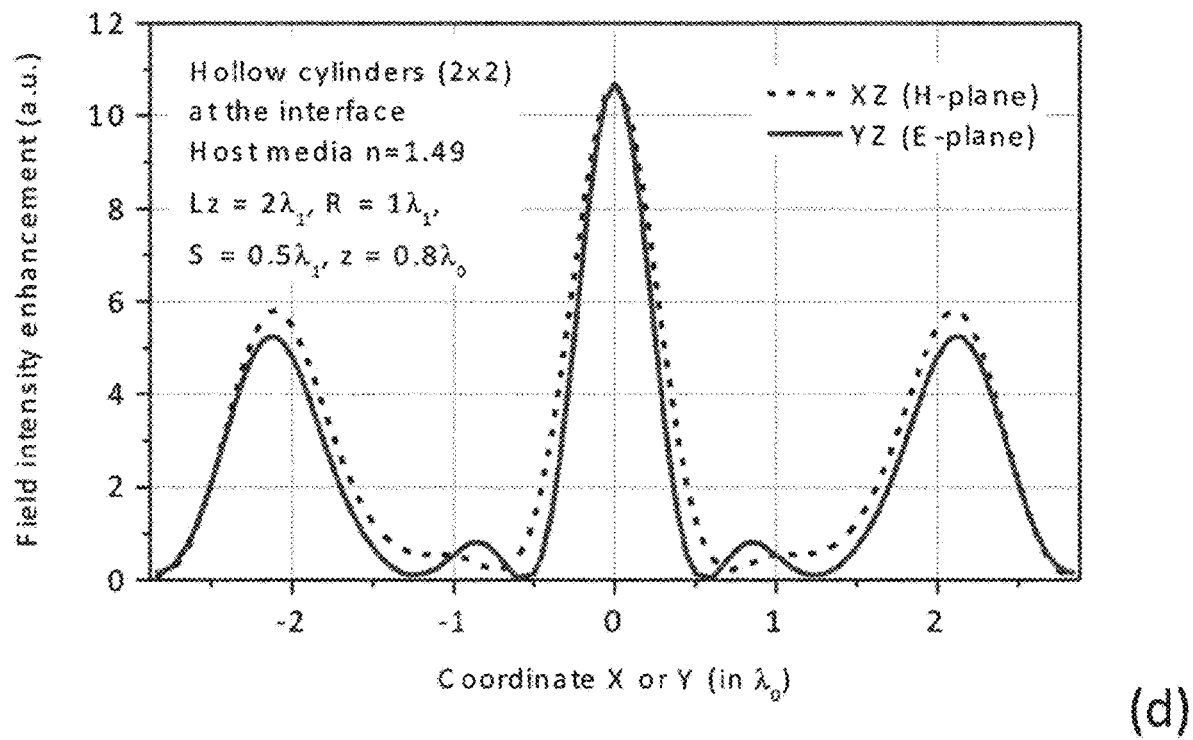
Figure 21:
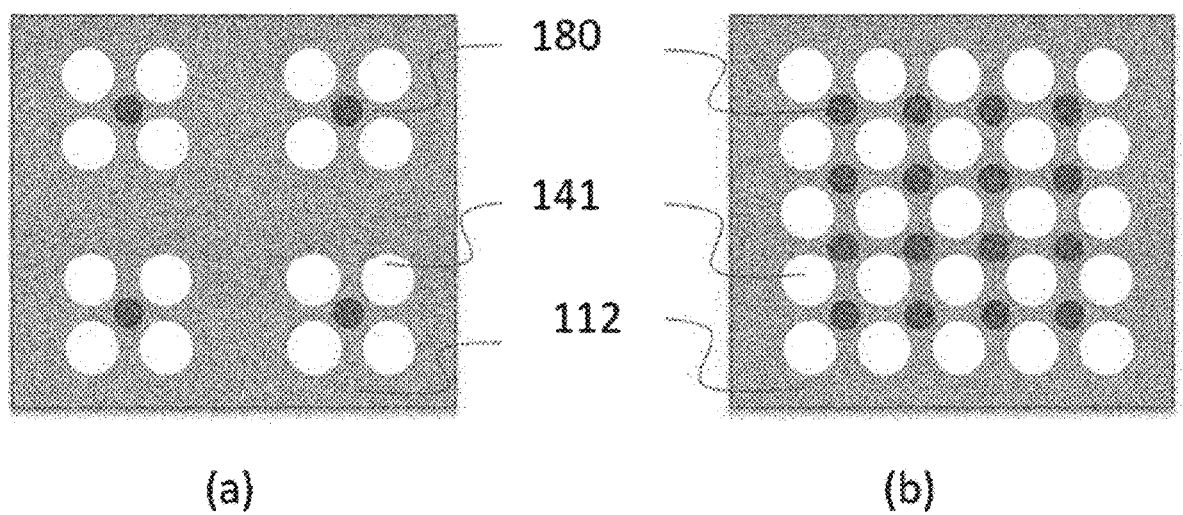
Figure 23:
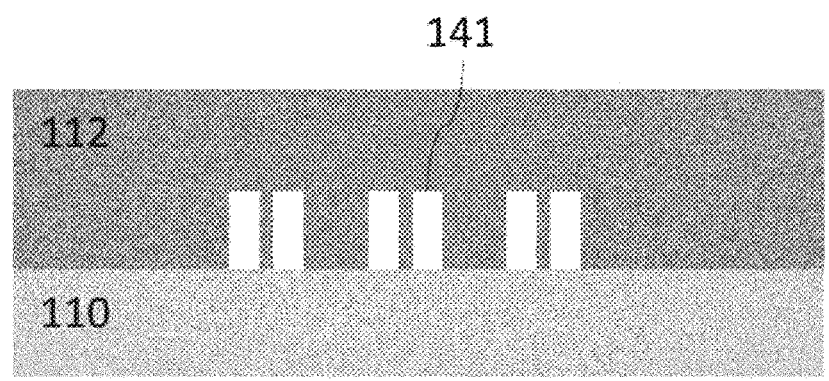

FIGS. 6a and 6b provide an analysis of the nanojet beam radiation angle of FIGS. 5a to 5e;

FIGS. 7a and 7b illustrate the complex electromagnetic phenomena underlying embodiments of the present disclosure;

FIGS. 8a to 8c illustrate near-field maps of nanojet beam produced by circular cylindrical cavities of different heights when illuminated by a unit-amplitude plane wave from below according to embodiments of the present disclosure;

FIGS. 9a to 9d show nanojet beams produced by a hollow circular cylindrical cavity under different angles of incidence of the unit-amplitude plane wave in XZ-plane (top row) and a section in XY plane (bottom row);

FIGS. 10a and 10b illustrate the nanojet beams phenomenon as observed for different host media with different refractive indices in XZ-plane (top row) and a section in XY plane (bottom row) according to embodiments of the present disclosure;

FIG. 11 shows the top view of four exemplary cylindrical cavities having each a different shape of the cross-section boundary, namely: (a) circular, (b) square, (c) 8-shape, and (d) rectangular, according to embodiments of the present disclosure;

FIGS. 12a to 12d show the corresponding simulated near-field maps for each cavity of FIG. 11 in XZ-plane (top row) and a section in XY plane (bottom row);

FIGS. 13a to 13c are schematic drawings of the field intensity distribution in the imaging plane for three exemplary cylindrical cavities with different cross-sections;

FIG. 14 provides a schematic drawing for the implementation of a component according to an embodiment of the present disclosure;

FIGS. 15a to 15f illustrate side views of alternate embodiments to the component of FIG. 14;

FIG. 16 illustrates a typical use scenario of the devices of FIGS. 14 and 15;

FIG. 17 illustrates a specific embodiment of the present disclosure, according to which the focusing component is based on a 2×2 planar array of identical hollow cuboid-shaped cavities embedded in a host medium;

FIG. 18 illustrates an alternate embodiment, in which the hollow cuboid-shaped cavities of FIG. 17 are replaced with hollow circular cylinders, oriented along the plane wave propagation direction;

FIG. 19 illustrates yet another embodiment, in which a 2×2 array of hollow circular cylinders is created at the boundary of the dielectric medium and free space;

FIG. 20 illustrates the profiles of the nanojet beams produced by all three embodiments of FIGS. 17, 18 and 19;

FIG. 21 provides two additional exemplary embodiments based on single-periodic (FIG. 21a) and double-periodic (FIG. 21b) arrays of hollow cylinders embedded in a host medium;

FIGS. 22a and 22b are schematic drawings illustrating a possible implementation embodiment for the periodic structures of FIGS. 21a and 21b with side views on the top row and top views on the bottom row;

FIG. 23 presents an alternate possible implementation embodiment for the periodic structures of FIGS. 21a and 21b.

The components in the figures are not necessarily to scale, emphasis instead being placed upon illustrating the principles of the invention.

5. DETAILED DESCRIPTION

The general principle of the present disclosure relies on the design of a new dielectric microstructure, which may be used for generating condensed low-dispersive optical beams in the near zone, also called nanojets. Its use is not limited to optical wavelengths. A step of refractive index in the dielectric microstructure gives rise to a diffraction phenomenon, which is in turn coupled to refraction and interference phenomena, and allows generating condensed beam(s) of radiation in the near zone when the dielectric microstructure is illuminated by a plane wave, depending on the shape and dimensions of the structure.

To the reverse, such a dielectric microstructure may be used for converting a non-planar wave front of an electromagnetic wave generated by a local source of electromagnetic radiation or by another beam-forming element, located close to the lateral edge of the step, into a locally planar wave front or beam.

The formation of one or several nanojet beam(s) in the near zone appears with a plane (or locally plane) wave incident on the device. When the device functions in reverse mode, with a local source placed in the focal point (i.e. in the nanojet beam region), a locally-plane wave is formed that is equivalent to a infinitely-long beam extending to the infinity.

The beam-forming function of such nanojet devices may be controlled by setting the step's edge line length and curvature, as well as its base angle.

Such a general principle allows designing new focusing and beam-forming components, which can replace the conventional focusing devices in dense optic and photonic systems, like integrated optical sensors used in photo/video cameras that are essential components in the field of mobile technology (e.g. smartphones, tablets, Augmented Reality (AR) and Virtual Reality (VR) glasses).

Thanks to the ultra-compact dimensions of such dielectric microstructures, as well as to the wide range and diversity of field patterns, which can be produced through the use of such microstructures, the present disclosure can be used in several fields of technology, including, but not limited to:
- eyewear electronics, including AR and VR glasses;
- optical sensors for photo/video/light field cameras;
- light communication systems, including quantum computers;
- bio/chemical sensors, including lab-on-chip sensors;
- microscopy, spectroscopy and metrology systems;
- integrated lens antennas for applications in the millimeter/sub-millimeter/infrared (IR) wavelength ranges.

The following discussion mostly focuses on optical applications and thus refers to material properties and fabrication methods relevant to nanoscale structures and wavelength. Nevertheless, the proposed design concepts can be easily scaled to other wavelength ranges, including microwaves, mm-waves, THz, IR, visible light and UV.

Inventors of the present disclosure have reached the conclusion that diffraction of a plane electromagnetic wave on the base surface of a dielectric material in the close vicinity of an abrupt change of level of this surface, also called a step, can result in the formation of condensed optical beams (so-called nanojets), when the surface on which diffraction occurs is in contact with a substance (material or gas) having a lower refractive index than that of the dielectric material. The number of beams and shape of each individual beam can be controlled by the variation of the step size and shape of the step edge line adjacent to the lateral and lower surfaces of the step. Unlike the well-known diffracted beams predicted by the Fresnel theory, the nanojet beams are low-dispersive (they show no or small wavelength dependence). Moreover, a same nanojet focusing component according to the present disclosure can produce multiple independent beams (having identical or non-identical shape) associated with different segments of the step edge line, which is not possible with Fresnel diffractive lenses. These unique features make the nanojet-based focusing components according to the present disclosure attractive for many today and future applications.

FIGS. 2 to 10 allow understanding the physical phenomena explaining the formation of nanojet beams according to the present disclosure.

Figure 1:
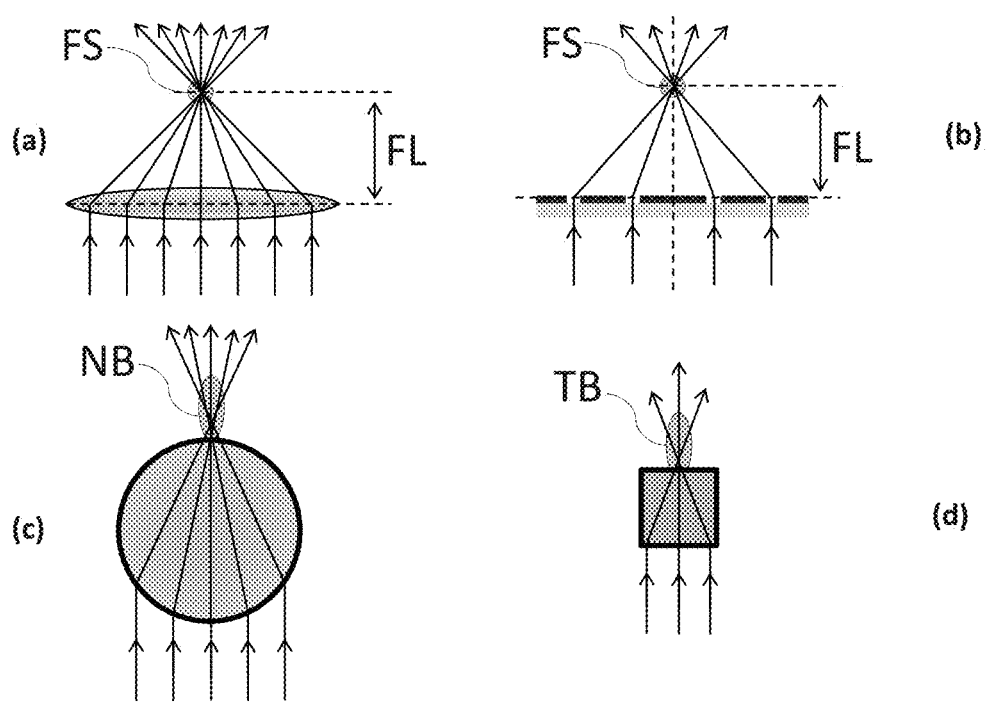
FIGS. 1A to 1D depict prior art conventional refractive (FIG. 1A) and diffractive (FIG. 1B) lenses, nanojet microsphere (FIG. 1C) and terajet cuboids (FIG. 1D)
Figure 2:
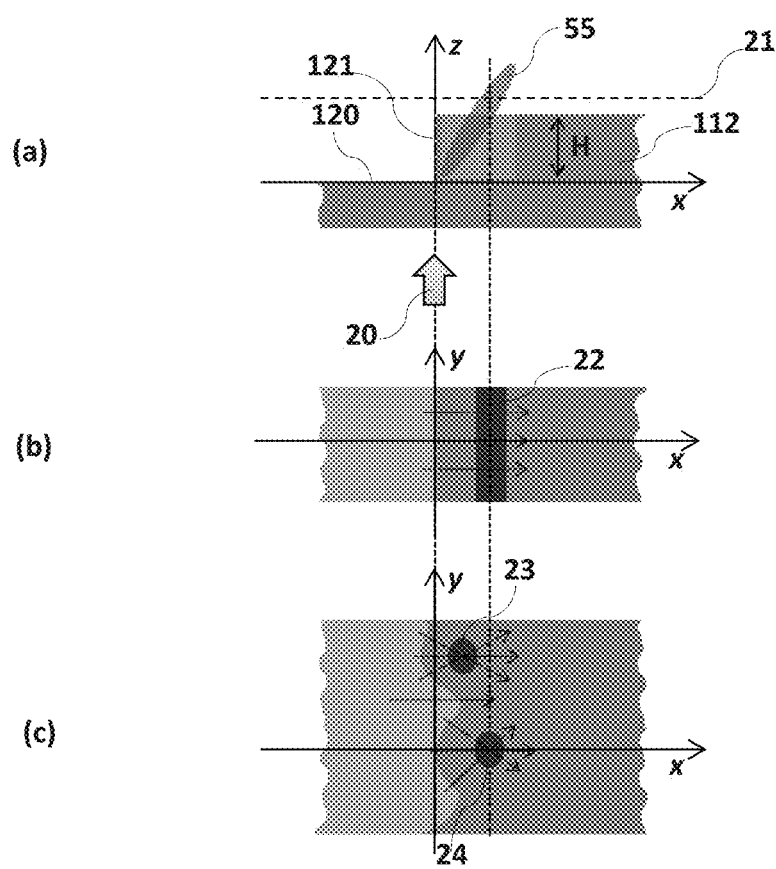
FIG. 2 is a schematic drawing of a nanojet beam produced by a dielectric layer with a step according to an embodiment of the present disclosure, with FIG. 2A a side view and FIGS. 2B and 2C top views according to two alternate embodiments.

FIG. 2 illustrates an embodiment of the present disclosure, where an abrupt change occurs in the level of the surface of a dielectric layer 112, thus forming a step in the layer. FIG. 2a shows a side view of the dielectric layer 112. FIGS. 2b and 2c respectively show top views in case of a step with a straight (FIG. 2b) and curved (FIG. 2c) edge lines.

As shown in FIG. 2a, the device is illuminated by an incident wave 20, coming from the base of the device and orthogonal to the base surface of the dielectric layer 112, along the z-axis. As schematically shown by the dashed arrows in FIGS. 2b and 2c, a nanojet beam 55 originates from the base edge of the step, which comprises a horizontal part 120 and a lateral part 121 (which may also be tilted with respect to the z-axis).

Spots referenced 22 to 24 indicate the corresponding hot spots in the near-field distribution formed in the imaging plane. The specific field distribution with two hot spots 23, 24 observed in FIG. 2*c* is associated with the shape of the edge line with two concave segments responsible for the formation of two independent nanojet beams.

Figure 3:
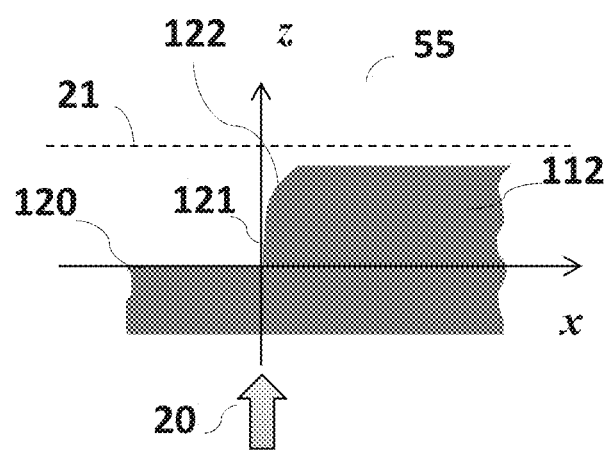
FIG. 3 illustrates an alternate embodiment to FIG. 2A, in which the step has a rounded top edge.

FIG. 3 illustrates an alternate embodiment to FIG. 2*a*, in which the step formed in the dielectric layer 112 shows a rounded top edge 122. Such a step will also generate a nanojet beam 55, which originates from the base edge of the step, when illuminated by an incident wave 20, like in FIG. 2*a*.

Figure 4:
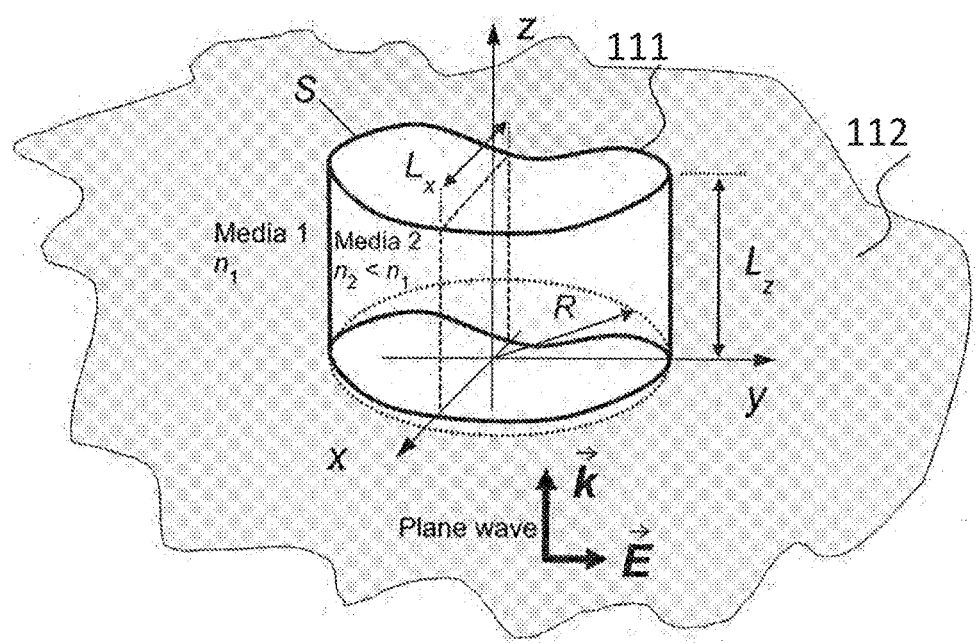
FIG. 4 illustrates the topology of a microcavity formed in a layer of dielectric material according to an embodiment of the present disclosure.

FIG. 4 illustrates an embodiment of the present disclosure, according to which the step formed at the surface of a layer of dielectric material is in fact the edge of a microcavity 111 made in the layer of dielectric material 112. The present disclosure is of course not limited to such an embodiment, and any abrupt change of level and index close to the surface of the dielectric material is sufficient for generating the physical phenomena, which will be described hereafter. Such a step can indeed be considered as the edge of a cavity of infinite size.

It must be understood that, in case of a step, the focusing function is to be associated not with the entire structure, but with an elementary segment of this step discontinuity. The other segments of the step discontinuity will contribute to the formation of other nanojet beams that may form all together (i) a wide uniform "blade like" nanojet beam as in case of an line of steps (see FIGS. 2*a* and 2*b*), or (ii) a ring in case of an arbitrary-large circular cylindrical cavity (see FIGS. 12*a*, 13*a*), or (iii) an arbitrary number of localized beams of different shapes produced by a curvilinear edge of an arbitrary-shaped cavity (see FIG. 13*c*).

For sake of simplicity, we therefore focus hereafter on the example of a microcavity 111 formed in the layer of dielectric material 112, like the one illustrated in FIG. 4.

As may be observed, such a cavity is cylindrical, with a cross-section of arbitrary shape. By cylindrical cavity, it is meant here, and throughout this document, a cavity which shape is a cylinder, i.e. a surface created by projecting a closed two-dimensional curve along an axis intersecting the plane of the curve. In other words, such a cylinder is not limited to a right circular cylinder but covers any type of cylinder, notably, but not exclusively, a cuboid or a prism for example.

FIG. 4 gives some notations, which will be used hereafter in the document. As may be observed, the cavity is immersed in a host medium Media 1 112 of refractive index $n_1$, and is void or filled with a material (air, gas, liquid, polymer material . . . ) Media 2 of refractive index $n_2$, such that $n_2 < n_1$.

For example, the cavity has a form of a circular cylinder filled in with vacuum ($n_2 \cong 1$) and embedded in a homogeneous non-dispersive dielectric medium with an example refractive index $n_1 = 1.49$.

A plane wave is incident from below along z-axis (see FIG. 4 for notations). FIG. 5 illustrates the formation of a nanojet beam by such a cavity when illuminated by this plane wave. More precisely, FIGS. 5*a* to 5*e* each correspond to a different wavelength of the incident electromagnetic wave, namely $\lambda_0 = 450$, 500, 550, 600 and 650 nm, and show near-field maps in the XZ-plane plotted in terms of the time average Poynting vector for the case of a hollow circular cylinder ($n_2 \cong 1$, $L_z = 740$ nm, R=370 nm) embedded in a medium with refractive index $n_1 = 1.49$. The cavity is illuminated by a unit-amplitude $E_y$-polarized plane wave from below.

As may be observed, the shape of the nanojet beam and its direction remain stable in a wide wavelength range for low dispersive dielectric material ($n_2/n_1$ close to constant when wavelength varies). The detailed analysis of the nanojet beam radiation angle is reported in FIGS. 6*a* and 6*b*. FIG. 6*a* illustrates the Poynting vector in the XZ-plane at three different planes defined as $z=z_0-L_z$, for the five different wavelengths of FIG. 5. FIG. 6*b* illustrates the nanojet beam radiation angle calculated based on the positions of maxima in FIG. 6*a* as a function of wavelength.

These data extracted from near-field maps reveal that the variation of the nanojet beam radiation angle does not exceed 3° for the wavelength range from at least 450 to 750 nm (hereafter the dielectric material is assumed to be homogeneous, isotropic and non-dispersive). As it is seen in FIG. 6*a*, the major contribution to the angle variation comes from the beam tilt above the cylinder ($z_0 = 1500$ nm, where $z_0$ is a relative position of the imaging plane defined with respect to the cavity base 120, i.e. $z_0 = z - L_z$), whereas the beam shape at ($z_0 = 500$ nm) remains stable for the entire wavelength range. Such a behavior is not typical for Fresnel-type diffractive lenses and thus requires detailed explanations.

The origins of the nanojet beams can be explained by the combination of three electromagnetic phenomena, which occur in the vicinity of the base edge of the hollow cavity (or more generally in the vicinity of the abrupt change of level in the surface of the dielectric material), namely:

diffraction from the index-step discontinuity associated with the base 120 of the cavity (or, more generally with the surface of lower level of a step formed in the host medium), refraction of the diffracted wave at the lateral edge 121 of the cavity (or more generally on the lateral part of the step), and interference of the refracted wave and the incident plane wave outside the cavity (or more generally in the host medium).

A schematic drawing illustrating these three phenomena is given in FIGS. 7*a* and 7*b*. As in FIGS. 5 and 6, we assume that host media is an optically-transparent non-dispersive dielectric material with a refractive index $n_1 = 1.49$ (e.g. plastic or glass) and the cavity is filled with vacuum, $n_2 = 1$. The incident plane wave arrives from below in the diagrams.

The key elements of the complex electromagnetic phenomena illustrated in FIGS. 7*a* and 7*b* are the following:

The incident plane wave induces currents at the dielectric-air boundary 120 associated with the cavity base (or more generally when reaching the step of index in the host medium induced by the abrupt change of level in its surface);

These induced currents are considered as Huygens secondary sources 50 to 53;

In line with the diffraction theory, the spherical waves 54 radiated by the Huygens sources cause some power leakage towards the 'shadow region', i.e. towards the lateral boundary 121 of the cavity;

While crossing the lateral (vertical) boundary, the waves radiated by the Huygens sources experience refraction that causes a tilt of the refracted wave on a certain angle in accordance with the Snell-Descartes's law.

In FIG. 7*b*, we can notice that outside the cavity the wave fronts coincide for different Huygens source positions along the cavity base line, thus creating a local field enhancement. The planar shape of these fronts evidences for the creation of a directive beam propagating out of the cavity.

Finally, outside the cavity the refracted wave is constructively interfering 56, 57 with the plane wave incident from below giving rise to the nanojet beam 55.

The nanojet beam creation is hence explained by phenomena that are non-dispersive in nature, namely (i) edge diffraction, (ii) refraction of the wave at the interface of two dielectric media, and (iii) interference. This explains why the shape of the beam and its radiation angle remain stable versus wavelength, as may be observed in FIGS. 5a to 5e.

Moreover, for the case of a normal incidence of a plane wave on the base of the cavity, the nanojet beam radiation angle is defined by the Snell's law and, thus, is only a function of two parameters:

(i) ratio between the refraction indexes of the host media and cavity materials, and (ii) the base angle of the prismatic cavity. For sake of simplicity, in the foregoing, we only consider a prismatic cavity with the base angle equal 90° thus having a cylindrical shape with vertical edges.

Last, the nanojet beam-forming phenomenon is associated with the edge (not a full aperture) of the cavity and occurs in the 2-D vertical plane orthogonal to the cavity cross-section (see FIG. 4 for notations).

As follows from FIG. 7b, the main contribution to the formation of the planar wave front of the refracted wave outside the cavity comes from the Huygens sources 50-53 located close to the lateral edge 121 of the cavity. Because of this, the refraction angle of the wave radiated outward the cavity is close to the critical angle for the wave incident on the same boundary from outside (FIG. 7a):

$$\theta_1 \approx \theta_{TIR}, \text{ where } \theta_{TIR} = \sin^{-1}(n_2/n_1) \text{ is the critical angle.} \quad (1)$$

The nanojet beam 55 is finally created as a result of the interference between the refracted wave and the plane wave incident from below, the angle of radiation of the nanojet beam ($\theta_B$) is defined by a vector sum of the two waves as schematically shown in FIG. 7a. These considerations lead one to the following approximate formula for the radiation angle of the nanojet beam:

$$\theta_B \approx (90° - \theta_{TIR})/2 \quad (2)$$

According to Eqn. (2), in the case of a host medium with index $n_1 = 1.49$ ($\theta_{TIR} = 41.8°$), the nanojet beam radiation angle should be $\theta_B \sim 24°$ that is slightly larger than observed in the full-wave simulations (see FIG. 6b). This difference is explained by some assumption made in the qualitative analysis. First, this analysis does not take into account the difference in the amplitude of the refracted and incident waves. Second, it does not take into account the rays launched by the Huygens sources located close to the cavity edge from outside that experience the total internal reflection on the cavity lateral edge. Being totally reflected, these rays also contribute to the formation of the nanojet beam. Note that these two effects are related to the total internal reflection phenomenon and thus cannot be accurately characterized using Snell/Fresnel model. Nevertheless, both effects (i) depend on the ratio of refraction indexes of the two media and (ii) result in reducing the nanojet radiation angle. Thus, the actual nanojet radiation angle can be smaller than that predicted by Eqn. (2).

FIGS. 8a to 8c illustrate near-field maps of the nanojet beam produced by cylindrical cavities ($n_1 = 1.49$, $n_2 = 1$, $R = 370$ nm) of different heights ((a) $H = L_z = 370$ nm, (b) $H = L_z = 740$ nm, (c) $H = L_z = 1110$ nm) when illuminated by a unit-amplitude plane wave from below. As may be observed, the nanojet phenomenon is well pronounced for the cavity size varying from about one to a few wavelengths in the host medium, namely $\frac{1}{2}\lambda_1 < L_z < 3\lambda_1$.

The minimum height is needed to form the planar wave front illustrated in FIG. 7b that gives rise to the nanojet beam. However, the height of the cavity (or the height of the step) should not be too large as compared to the length of the nanojet beam, in order for it to be useful outside the focusing component.

As shown on FIGS. 8a to 8c, the length of the nanojet beam can vary from a few to several wavelengths in the host medium depending on the cavity shape and size.

Based on the 2-D ray-tracing analysis of FIG. 7b, the main contribution in the formation of the nanojet beam comes from the feeds located close to the cavity lateral edge (or to the lateral part of the step). The corresponding 'effective aperture' responsible for the formation of the nanojet beam is estimated as about one half of the wavelength in the medium inside the cavity ($\frac{1}{2}\lambda_2$) that is to be counted from the lateral edge inward the cavity. For the cavity having arbitrary shape, this aperture is to be defined along the line orthogonal to the cavity cross-section boundary, S (see FIG. 4).

In 2-D case (which may correspond to any vertical cross-section, e.g. in xz-plane), the local field intensity enhancement (FIE) achieved thanks to the nanojet beam formation is about a factor of 2 compared to the incident plane wave. A larger FIE can be achieved by modifying the shape of the cavity cross-section, S, as will be explained hereafter in greater details, or by combining contributions from several cavities.

The nanojet beam full width at half power (FWHP) can vary from about $\frac{1}{2} \lambda_1$ (i.e. the Abbe diffraction limit) to several wavelengths and more depending on the shape of the cavity.

FIGS. 9a to 9d show nanojet beams produced by a hollow cylindrical cavity ($n_1 = 1.49$, $n_2 = 1$, $L_z = 740$ nm, $R = 370$ nm) under different angles of incidence of the unit-amplitude plane wave in XZ-plane, namely $\theta = 0°$ in FIG. 9a, $\theta = 10°$ in FIG. 9b, $\theta = 20°$ in FIG. 9c and $\theta = 30°$ in FIG. 9d.

The symmetry of the near-field patterns in the XY-plane (see FIG. 9a) evidences that the beam shape and radiation angle remain nearly constant for both TE (Transverse Electric) and TM (Transverse Magnetic) polarizations of the incident wave.

Figure 9:
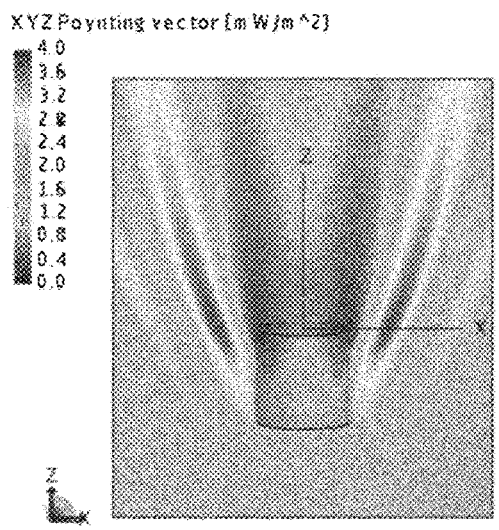
Figure 9:
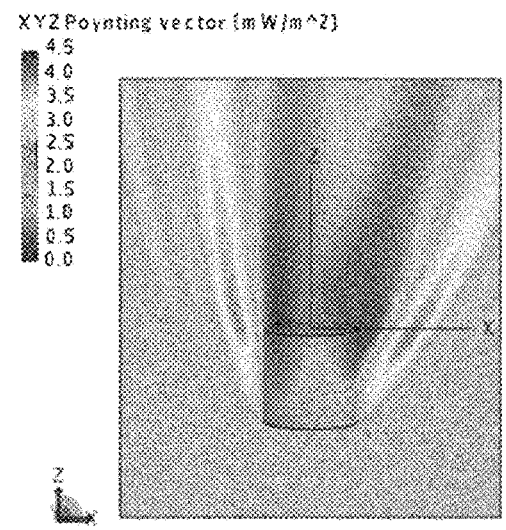
Figure 9:
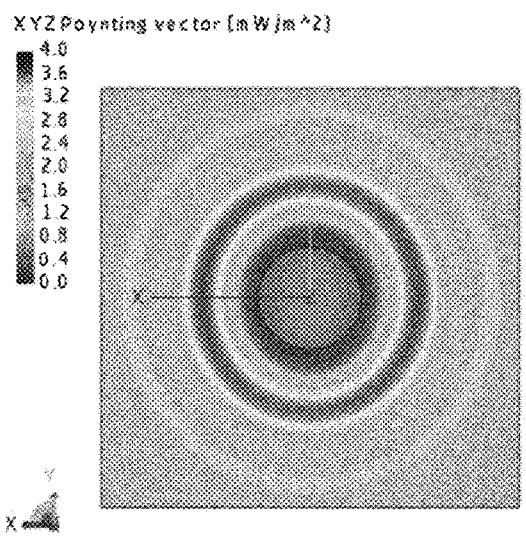
Figure 9:
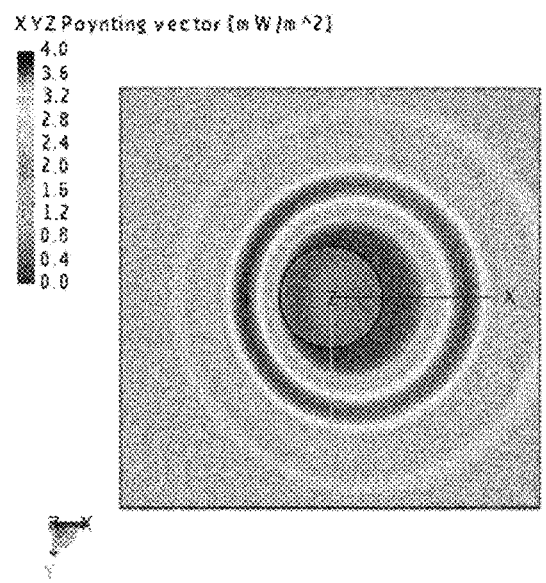
Figure 9:
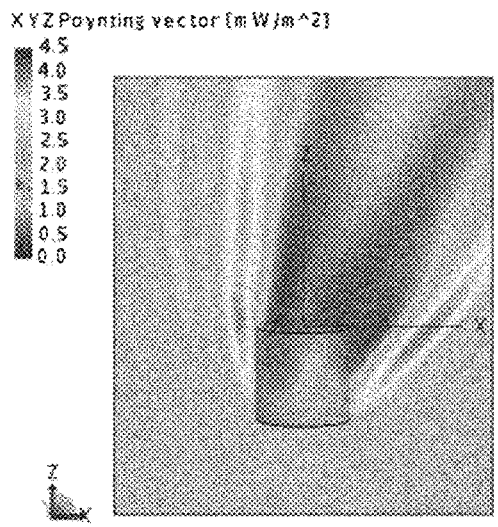
Figure 9:
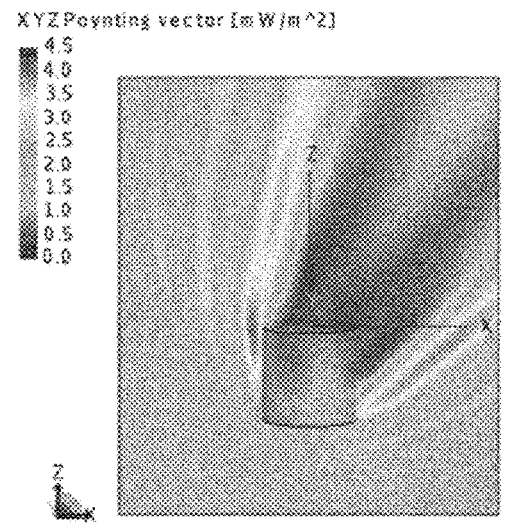
Figure 9:
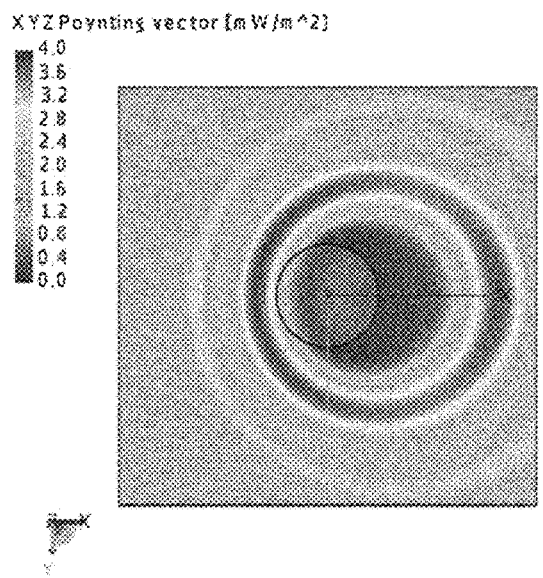
Figure 9:
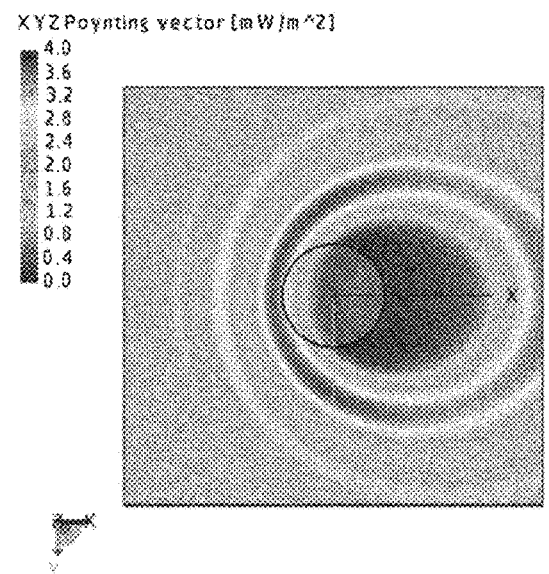

Moreover, in case of an inclined incidence, it may be observed in FIG. 9 that the beam radiation angle changes in correspondence to the angle of incidence of the plane wave. The shape of the beam and field intensity enhancement remain nearly constant for incidence angle up to about $\theta_B$.

Figure 10:
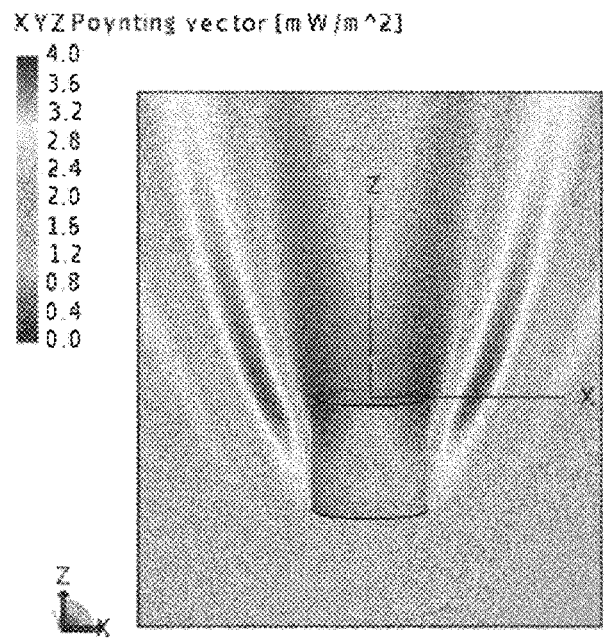
Figure 10:
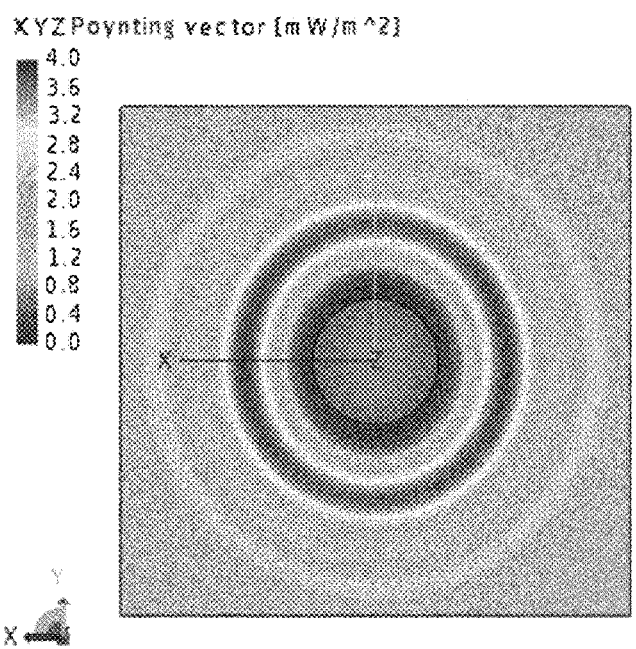
Figure 10:
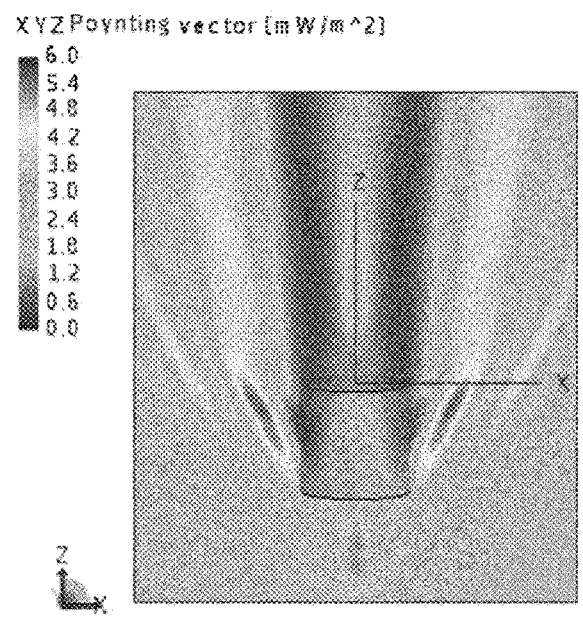
Figure 10:
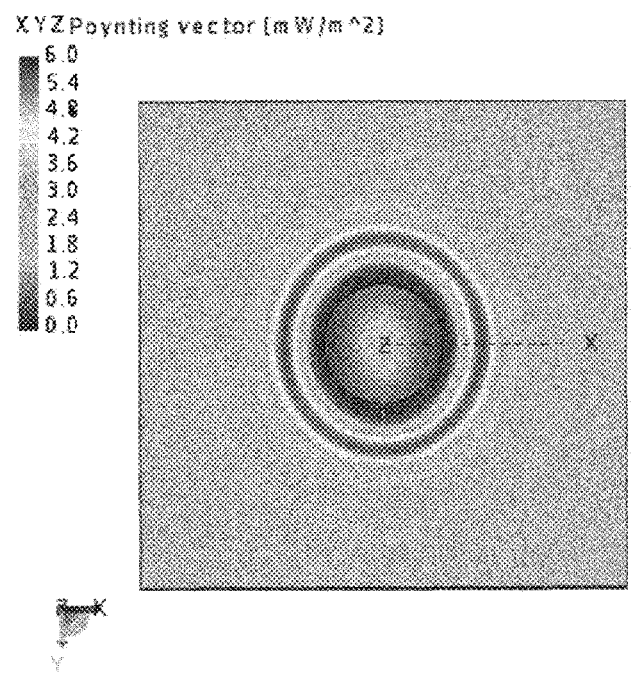

FIG. 10 illustrates the nanojet beams phenomenon as observed for different host media, including standard optical plastics and standard or doped glass. Such nanojet beams are produced by a hollow circular cylindrical cavity having the same physical dimensions ($n_2 = 1$, $L_z = 740$ nm, $R = 370$ nm) but embedded in a host medium of refractive index $n_1 = 1.49$, in FIG. 10a and $n_1 = 2.0$, in FIG. 10b.

The understanding of the complex electromagnetic phenomena illustrated through FIGS. 2 to 10 allows designing interesting devices, which can be used as nanojet focusing components, beam-forming components, or more generally components for forming desired field intensity distribution in the near zone. Such components may be used for transforming an incident plane wave into one or multiple independent beams, or, conversely, for transforming an incident non-planar wave (whatever its wavelength) into a locally plane wave, in accordance with the symmetrical path properties of electromagnetic waves.

As explained above in the present disclosure, the formation of the nanojet beams is associated with the lateral part of the step in the layer of dielectric material, or with the edge of the cavity, but not its full aperture. By optimizing the shape of the cross-section of the cavity S, it is possible to control the shape of the nanojet beam(s) produced by this cavity.

FIG. 11 shows four exemplary cylindrical cavities having each a different shape of the cross-section boundary, namely: (a) circular, (b) square, (c) 8-shape, and (d) rectangular. The dashed lines schematically show some vertical cut planes in which the nanojet beams are generated when these cavities are illuminated by a plane wave propagating along the z-axis, from the plane of the figures. These cut planes are defined with respect to the direction of the normal vectors defined at the corresponding points of the cavity cross-section boundary. The corresponding simulated near-field maps for each cavity are shown in FIGS. 12a to 12d, which illustrate the near-field patterns in xz-plane (y=0) and xy-plane (z=1000 nm–$z_0$) for hollow cavities ($L_z$=$L_x$=R=740 nm) having same height and radius but different cross-section shapes illuminated by a unit-amplitude plane wave from below: (a) circular, (b) square, (c) 8-shape, (d) rectangular. The spots 101 to 104 in the xy-plane identify the nanojet beams, whose shapes and positions are well in line with the predictions given in FIG. 8 (these near-field maps are computed at arbitrary-selected xy-plane $z_0$=1000 nm).

In particular, FIG. 12a shows that the axially-symmetrical circular cavity produces a diverging conical beam. It is interesting to note that this conical beam is nearly-symmetrical (see the near-field pattern in horizontal xy-plane), which is an evidence for the polarization-insensitive behavior of such component. In this configuration, the maximum FIE is equal to a factor of ~2, compared to the plane wave propagating in the same host media.

Figure 12:
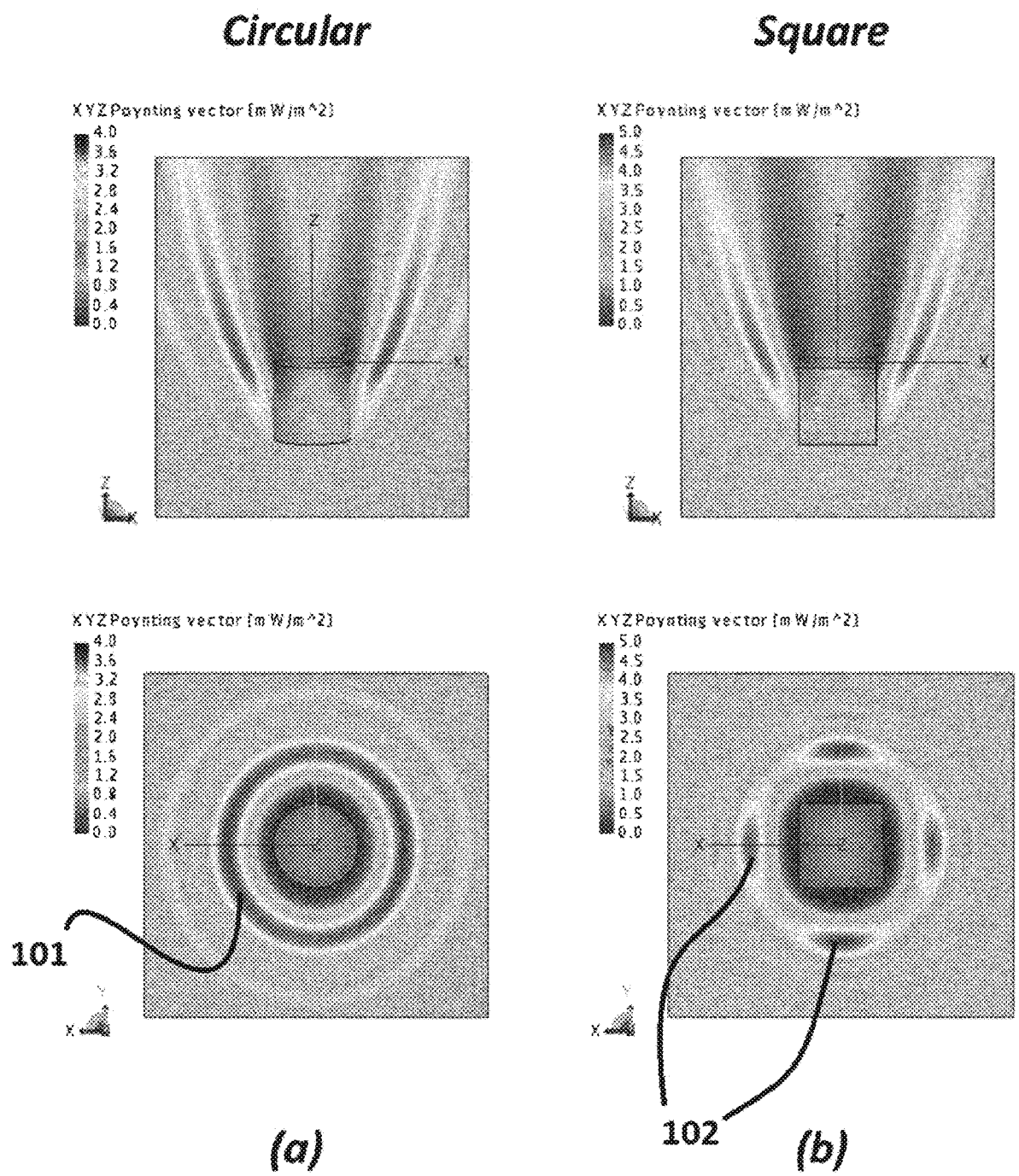
Figure 12:
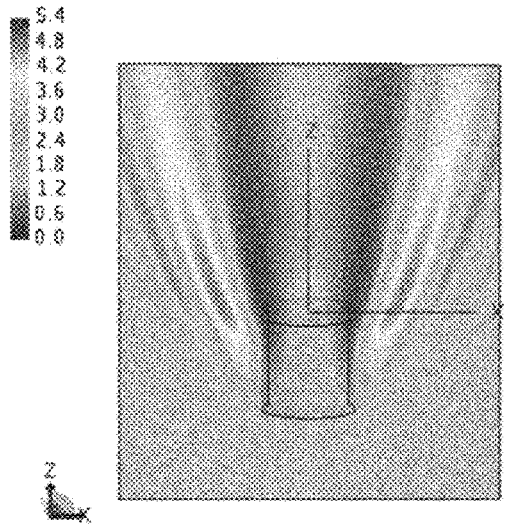
Figure 12:
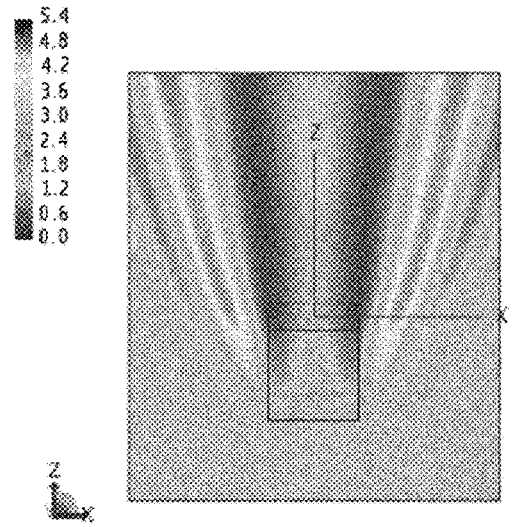
Figure 12:
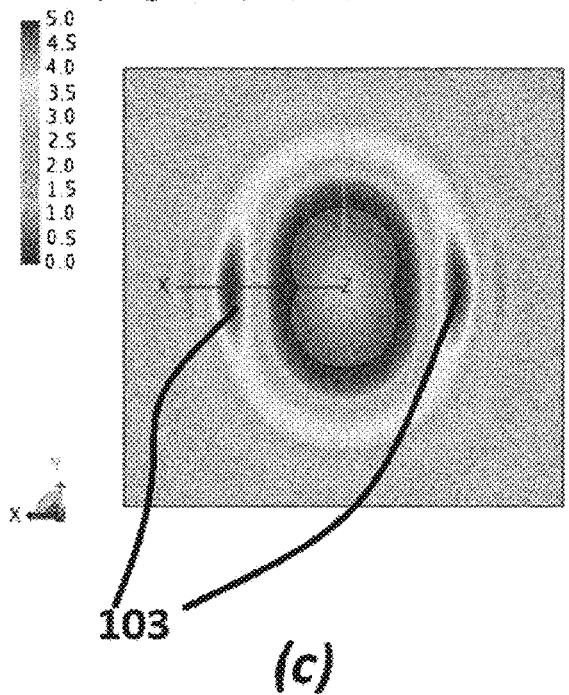
Figure 12:
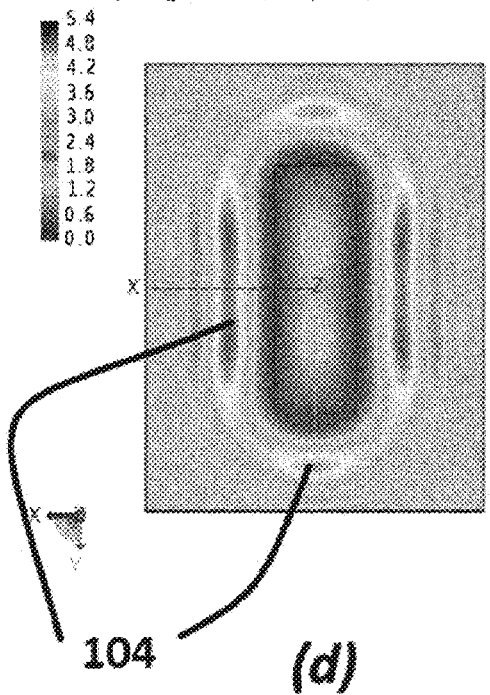

Note that the near-field maps in FIG. 12 are plotted in terms of the time average Poynting vector, P. In case of a plane wave propagating in a non-dispersive homogeneous dielectric medium with a refractive index n, this reference electromagnetic field quantity is defined as:

$$P = E_m^2/2\eta \approx 1.3 \; n \; E_m^2 \; \left[\frac{mW}{m^2}\right], \quad (4)$$

where $E_m$ is the amplitude of the E-field, $\eta$ is the wave impedance in the medium and n is the refractive index. In case of a host media with refractive index n=1.49, the reference value of the power density characterized by the time average Poynting vector is ~1.94 mW/m2.

FIGS. 12b and 12c show how the transformation of the cavity cross-section, S, from the circular shape to rectangular and 8-shape causes the formation of multi-beam near-field patterns with four (referenced 104) and two (referenced 103) nanojet beams, respectively. This beam-forming effect is related to the transformation of the boundary segments from a convex shape to a planar shape and then to concave shape, respectively. The beams observed in FIGS. 12b and 12d have a radiation angle similar to the one of the conical beam produced by the circular cylinder (FIG. 12a). At the same time, the width of the beams in terms of the azimuth angle is different. The larger the internal angle of the concave segment of the cavity cross-section boundary, S, the narrower the beam and the higher the field intensity. In particular, the FIE for the two cavities presented in FIGS. 12b (square shape) and 12c (8-shape) is equal to a factor of ~2.5 and ~2.8, respectively.

Finally, FIG. 12d shows that a wide blade-like nanojet beam is generated by the hollow rectangular cavity. This example demonstrates the possibility to form wide beams that can be of interest for certain applications requiring uniform illumination of narrow shaped areas.

The boundary curvature of the cavity is hence a tool for changing the nanojet beam shape, position and field intensity enhancement.

The same approach can be used to build more complex components with symmetrical or non-symmetrical cross-sections producing an arbitrary number of identical or different nanojet beams.

Figure 13:
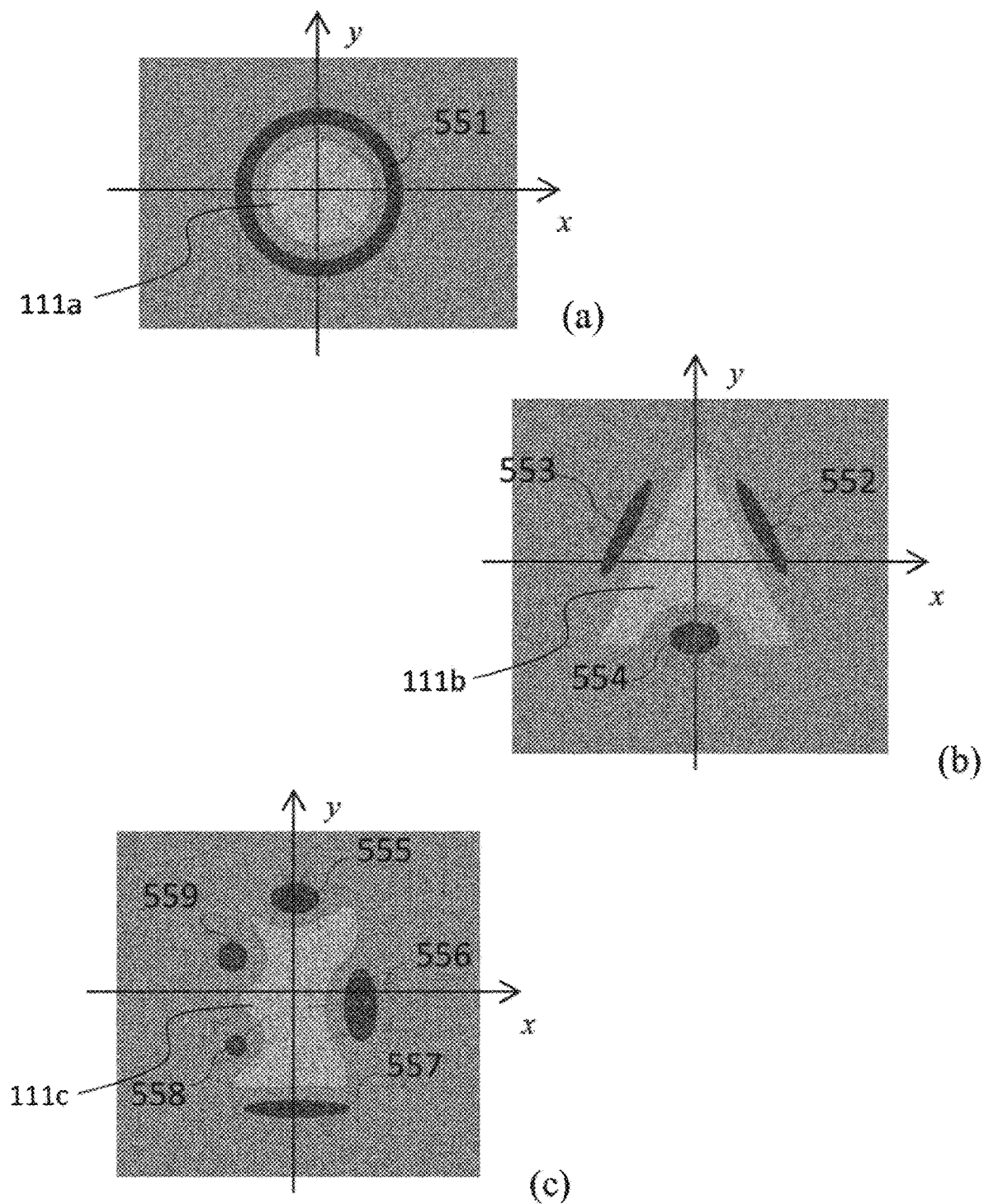

Some of these exemplary embodiments are illustrated by FIG. 13, which presents a schematic drawing of the field intensity distribution in the imaging plane for three exemplary cylindrical cavities with different cross-sections. More precisely, FIG. 13a shows a cavity 111a with a circular cross-section, as already illustrated by FIG. 11a: the dashed arrows schematically show that nanojet beams originate from the bottom of this cavity 111a. The ring 551 indicates the hot spots in the near-field distribution formed due to these nanojet beams.

FIG. 13b shows a non-symmetric cavity 111b, which cross-section in the xy-plane is somehow triangular, but with one of the three edges of the triangle which is concave. Such a circa triangular cavity 111b creates three spots 552, 553 and 554, one of which (554) is enhanced, thanks to the concave face.

FIG. 13c shows a cavity, which is arbitrary-shaped with five straight or concave segments. Spots 555 to 559 indicate the hot spots in the near-field distribution formed due to the nanojet beams originating from the base edge of the step, as schematically shown by the dashed arrows. The specific field distribution with five hot spots observed in FIG. 13c is linked to the specific shape of the edge line having five straight or concave segments responsible for the formation of five independent nanojet beams.

FIG. 14 provides a schematic drawing for the implementation of such a component according to an embodiment of the present disclosure.

Such a device presents a multi-layer structure comprising:
- a first layer 110 forming a substrate, which may be made in glass or plastic for example;
- a second layer of dielectric material 112 abutting the substrate 110;
- a third layer forming a superstrate 113, on top of the dielectric layer 112. The superstrate may be made in glass or plastic for example. In the embodiment of FIG. 11, the same material is used for the substrate 110 and the superstrate 113, although this is not compulsory.

A cavity 111 of arbitrary cross-section is formed in the layer of dielectric material 112. FIG. 14 offers a 3D-view of the cavity 111, as well as both a side view and a top view of the component.

In an embodiment, the device of FIG. 14 is a planar optically-transparent (e.g. glass) plate with embedded cylindrical micro-cavities oriented to be orthogonal to its surface. Both the substrate 110 and the superstrate 113 are glass plates, and the layer 112 of dielectric material is a thin film made in an optically-transparent polymer like PMMA (Poly (methyl methacrylate)).

A manufacturing process of such a component may consist in, first, depositing a film 112 of desired thickness on the glass plate 110; then cavities 111 are created in this film 112 using any established microfabrication technique, e.g. optical or e-beam lithography. Finally, the structure is covered with another glass plate 113.

Hence, unlike existing analogs, such a component can be fabricated using established planar fabrication technologies, thanks to its simple topology and availability of dielectric materials with the required refractive index.

FIGS. 15*a* to 15*f* illustrate side views of alternate embodiments to the component of FIG. 14.

In FIG. 15*a*, the component is made of a single layer of dielectric material 112. An abrupt change of the surface level of the layer of dielectric 112 forms a step, which also induces a step of index for an incident wave reaching the component from the bottom, as air surrounding the component has a lower refractive index than the dielectric material 112. Hence, the complex electromagnetic phenomena described above in relation to FIGS. 2 to 10 take birth, first by diffraction of the plane incident wave on the lower part 120 of the surface, and then by refraction of the diffracted wave on the lateral part 121 of the step.

The component may also be immersed in another material than air, for example another gas, or the lower part 120 of the surface may be in contact with any other substance having a lower refractive index than the dielectric material 112.

FIG. 15*b* illustrates another embodiment, according to which the component comprises a single layer of dielectric material 112, in which is formed a cavity as a through-hole: the height of the cavity thus corresponds to the thickness of the dielectric layer 112.

FIG. 15*c* illustrates another embodiment, according to which the component comprises a single layer of dielectric material 112, in which is formed a cavity 111, which height is smaller than the thickness of the layer of dielectric material 112. Both the height of the cavity and its cross-section may be arbitrarily chosen, as a function of the beam to be produced by the component. Notably, the top of the cavity need not necessarily correspond to the top surface of the dielectric layer 112.

A specific embodiment in which the cavity 111 is of infinite dimensions corresponds to the embodiment of FIG. 15*a*, the step corresponding to an edge of cavity 111.

FIG. 15*d* illustrates yet another embodiment, according to which the component presents a double-layer structure, namely a first layer 110 forming a substrate, on top of which is placed a second layer 112 of dielectric material. A cavity 111 is formed in the layer 112 of dielectric material. A specific embodiment, where the first layer 110 and the second layer 112 are made in the same material, corresponds to the embodiment of FIG. 15*c*.

FIG. 15*e* corresponds to yet another embodiment, in which the device presents a three-layer structure, as in the embodiment of FIG. 14. However, the substrate 110 and the superstrate 113 need not necessarily be made in the same material.

FIG. 15*f* illustrates yet another embodiment, in which the component comprises a set of two or more cavities formed in the layer of dielectric material. The cavities may be arranged in regular arrays, or grouped in any number and any pattern depending on the beam(s) to be generated. Such multiple cavities may be formed in any of the single-layer or multi-layer embodiments of FIGS. 15*b* to 15*e*.

Such an embodiment will be described in greater detail in the forthcoming in relation to FIGS. 17 to 23.

FIG. 16 illustrates a typical use scenario of the devices of FIGS. 14 and 15. For sake of simplicity, the component illustrated in FIG. 16 corresponds to the component of FIG. 14; it must be understood, however, that it may be replaced by any component corresponding to any of the embodiments of FIG. 15 as well.

An emitting element 130 emits a plane electromagnetic wave towards the base surface of the device 132. The emitting element 130 can be either a part of the system (e.g. like in AR/VR glasses) or just a model of an external light source (e.g. scattered ambient light collimated by an objective lens, like in case of a photo camera). For example, the emitting element 130 may be:

- ambient light coming from a source located far away;
- light produced by a light source directly attached to the nanojet component 132 (e.g. photodiode or optical fiber);
- optical beam produced by another focusing element 132.

It can be located at any distance from the cavity 111 and generate a directive light beam or an omnidirectional light emission.

Depending on the design and fabrication method, the structure of device 132 may consist of two or more layers sealed together, as explained above in relation to FIG. 15. In the embodiment of FIG. 16, such a device presents a three-layer structure with one or several microcavity(ies) 111 on one or both surfaces of the sealed substrate 110 and superstrate 113. In some embodiments, this structure of device 132 may be directly attached to either the emitting element 130 and/or receiving element 131. For example, it may take the form of a flexible component directly placed on a sensor or a plano-convex lens.

The cavity or cavities 111 are hollow (hence filled with air), or filled with a material with a refracting index lower than that of the substrate 110.

A receiving element 131 must be located within a certain distance from the cavity that depends on the length of the nanojet beam generated by the cavity. This distance can generally vary from about 3 to 10 wavelengths. The dashed circle in FIG. 16 indicates the maximum distance $R_{max}$ to the receiving element 131. It can be larger for certain arrangement of cavities, comprising more than one cavity (see below in relation to FIGS. 17 to 23). The possible relative positions of the cavity, emitting and receiving elements are defined by the nanojet beam 55 radiation angle and the angle of incidence of the incoming wave.

The receiving element 131 may be:

- a detector, e.g. photodiode in a camera,
- a target, e.g. quantum dots, nanoparticles or molecules inside a water or blood solution {spectroscopy, microscopy or lab-on-chip device},
- another focusing, beam-forming or light-guiding element, e.g. lens, grating, optical fiber, AR/VR glasses, light communication, etc.

As the component 132 according to the present disclosure may be used, either for generating beams 55 from incident plane wave, or for generating locally plane waves from incident non-planar waves or beams, the receiving 131 and emitting elements 130 may be reversed.

Such components 132 can be used as building blocks of integrated optical sensors and/or light-guiding and light-processing systems, as well as stand-along focusing devices (e.g. a near-field probe). They are capable of near-field focusing with a subwavelength resolution and field intensity enhancement (FIE) of at least a factor of two, operating in the optical range.

FIG. 17 illustrates a specific embodiment of the present disclosure, according to which the focusing component is based on a 2×2 array of hollow cuboids embedded in a host medium. FIG. 17*a* illustrates the topology of such a component, while FIG. 17*b* provides simulation results of the time-averaged power distribution when the component is illuminated by a unit-amplitude plane wave propagating along z-axis ($n_1=1.49$, $L_x=L_y=L_z=2\lambda_1$, $S=0.5\lambda_1$).

The component of FIG. 17*a* comprises four hollow cuboids ($n_2=1$) 140 embedded in an optically transparent host medium 112 with refractive index $n_1>n_2$. For instance, this can be a glass, plastic (e.g. PMMA), or polymer (e.g. PDMS (Polydimethylsiloxane)).

A nanojet beam is generated on the axis of the 2×2 array of hollow ($n_2=1$) cuboids 140 embedded in a homogeneous dielectric medium 112 with a refractive index $n_1=1.49$ that is a typical value for glass and plastics in the optical range. Analysis shows that, by optimizing the size, shape and relative positions of the cuboids with respect to the host medium refractive index and wavelength of the incident plane wave, a nanojet beam can be generated with the beam full width at half power (FWHP) of $~\lambda/2n_1$ and FIE of at least a factor of 5.

FIG. 18 illustrates an alternate embodiment, in which the hollow rectangular cuboids 140 are replaced with hollow cylinders 141, oriented along the plane wave propagation direction. As in FIG. 17, FIG. 18*a* illustrates the topology of such a component, while FIG. 18*b* provides simulation results of the time-averaged power distribution when the component is illuminated by a unit-amplitude plane wave propagating along z-axis ($n_1=1.49$, $L_z=2\lambda_1$, $R=\lambda_1$, $S=0.5\lambda_1$).

The cylindrical shape facilitates manufacturing procedure, thanks to elimination of sharp vertical edges of the cuboids. In particular, such cylindrical apertures can be fabricated via optical lithography or another established planar micro-fabrication technology, like nanoimprinting or replica molding.

FIG. 19 illustrates yet another embodiment, in which a 2×2 array of hollow cylinders 141 is created at the boundary of the dielectric medium 112 and free space, e.g. on the surface of a glass or plastic plate. When illuminated by a plane wave from the media side, such a component produces a nanojet beam in free space close to the surface of the plate 112. This embodiment can be advantageous for applications that require an air gap between the focusing component and the object under test that is a typical scenario for optical data storage, microscopy, spectroscopy, and metrology systems.

As in FIG. 18, FIG. 19*a* illustrates the topology of such a component based on a 2×2 array of hollow cylinders created at the interface of the dielectric medium and free space, while FIG. 19*b* provides simulation results of the time-averaged power distribution when the component is illuminated by a unit-amplitude plane wave propagating along z-axis ($n_1=1.49$, $Lz=2\lambda_1$, $R=\lambda_1$, $S=0.5\lambda_1$).

The profiles of the nanojet beams produced by all three embodiments of FIGS. 17, 18 and 19 are illustrated in FIG. 20. The profiles are plotted in terms of field intensity enhancement (FIE) defined with respect to the field intensity of the plane wave propagating in the same host media. More precisely, in FIG. 20*a* one can see the beam profiles along z-axis, whereas FIGS. 20*b*-20*c*-20*d* show the beam cross-sectional view in the plane $z=z_m$, where $z_m$ is a point with the maximum field intensity derived from FIG. 20*a*. As may be observed, the subwavelength resolution is well preserved for all three embodiments, whereas the FIE varies in the range of about 5 to 11 a.u. Note that in all cases, FIE is defined as a ratio between the field intensity level in a given point with and without a focusing device according to embodiments of the invention, with respect to the unit-amplitude plane wave propagating in the same host medium, namely glass (embodiments of FIGS. 17 and 18) and free space (embodiment of FIG. 19).

Additional analysis shows that the focal spot position along z-axis can be changed within a certain range by varying size and spacing between cuboids (cylinders). The possibility of changing the nanojet beam length and position can be of interest for applications that require in-depth scanning or imaging.

FIG. 21 provides two additional exemplary embodiments based on single-periodic (FIG. 21*a*) and double-periodic (FIG. 21*b*) arrays of hollow cylinders 141 embedded in a host medium 112. In both embodiments, the hollow cylinders form a number of regularly-spaced sub-arrays of 2×2 closely-positioned scatterers that act like the component illustrated in FIG. 18. Note that in case of FIG. 21*b*, each hollow cylinder 141 simultaneously contributes to the formation of four nanojets.

The embodiments of FIG. 21 can be of interest for systems that can benefit from a multi-spot focusing capability. For instance, it could be cameras or spectroscopy systems.

Of course, in all the embodiments described above, the shape of the cavities is not restricted to regular cylinders or cuboids. As explained in relation to FIGS. 2 to 10, the electromagnetic phenomena highlighted by the inventors of the present disclosure will occur for any shape of cavity, whether cone-shaped, a prism, or a cylinder (in the broad sense of the term, i.e. a surface created by projecting a closed two-dimensional curve along an axis intersecting the plane of the curve), and whatever its cross-section. Moreover, the main axis of the cavity may be orthogonal to the surface of the dielectric material or the substrate, or may be tilted with any angle with respect to this surface.

Figure 22:
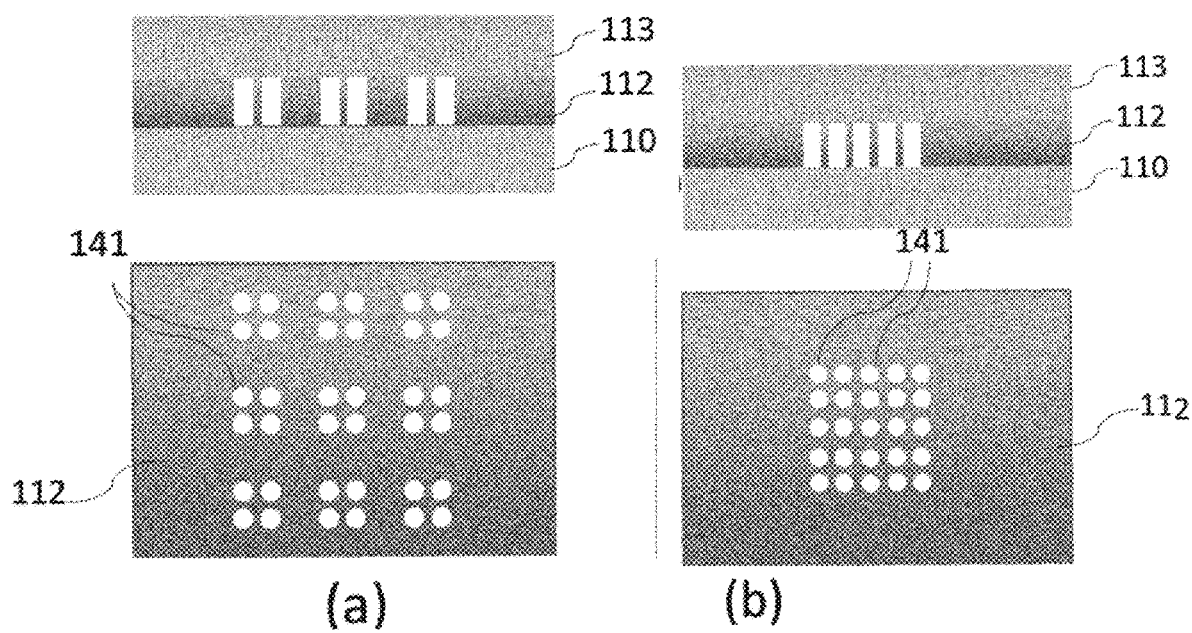

FIG. 22 is a schematic drawing illustrating a possible implementation embodiment for the periodic structures of FIGS. 21*a* and 21*b*.

The proposed component, in all its embodiments, can be, for instance, fabricated in the form of a thin film with perforated apertures attached to a glass plate or directly to a flat surface of another optical component, such as a plano-convex lens. For the embodiments of FIGS. 17, 18, 19, and 21, it can then be covered with another layer of an optically-transparent media (e.g. another glass plate).

The film can be made of an optically transparent material, like PMMA (Acrylic), that is to be deposited directly on the surface of the supporting component (e.g. glass plate or lens). For instance, this can be done by spin-coating that enables deposition of thin nanofilms with the desired thickness (order of a few hundred nanometers).

The apertures (that will serve as hollow cuboids) can then be created, for instance, using the optical or e-beam lithography technology.

The periodic structures can be, potentially, fabricated using the maskless interference lithography that is faster and cheaper than standard optical lithography.

FIG. 23 presents an alternate possible implementation embodiment for the periodic structures of FIGS. 21*a* and 21*b*.

In this alternate implementation, the hollow cuboids can be fabricated using nanoimprinting or replica molding methods in an optically transparent material, e.g. soft organic polymer such as PDMS, and then attached to a surface of a glass plate acting as a support.

The manufacturing processes described in relation to FIGS. 22 and 23 are given as mere examples, in order to highlight the fabrication feasibility of the device according to the present disclosure, using established microfabrication methods. However, some other manufacturing methods may also exist, or be better suited for a mass production.

A new method and a set of components for near-field focusing and beam-forming have been presented.

The components have a form of conical, prismatic or cylindrical cavities, whose cross-sections are shaped to produce a different number of nanojet beams with adjustable repartition and outline.

The shape and arrangement of the nanojet beams in xy-plane and their extension in z are defined by the shape of the cavity cross-section. More generally, a simple step in the surface of a dielectric layer is enough for generating such nanojet beams.

The length of the beam depends on the cavity size and index ratio.

For a given index ratio, the main parameters (i.e. length, width, angle of radiation, and FIE) remain stable in the wavelength range of at least ±20%.

Such components provide numerous advantages, as compared to prior art focusing devices, among which:
- a simple topology, which may be planar, or flexible, and provides a good mechanical rigidity;
- they are based on standard materials, and hence can be fabricated using standard dielectric materials, like optical glasses or plastics. There is no need for high-index materials (unlike for prior art SDC);
- a simple fabrication: they can be manufactured using established planar microfabrication methods, such as laser and e-beam lithography, nanoimprinting, replica molding, etc.
- a simple integration: they can either be used as stand-along components (e.g. near-field probe), or attached to other optical components (e.g. plano-convex lens), or used as a building blocks of an integrated focusing system (e.g. camera sensors);
- good performance characteristics, with a subwavelength resolution of $\sim\lambda/2n_1$ (i.e. one-half of the wavelength in the host medium) and a FIE of a factor of 2 to at least 11.

It should be noted that in one embodiment of the disclosure, the present technique may not be limited to the non-radiative (reactive) zone but can also comprise the Fresnel radiative, the transition, and partly the far-field zones.

The invention claimed is:

1. A device for forming a field intensity distribution in a near zone, from propagating electromagnetic waves incident on said device, said device comprising:
   a single layer of dielectric material, said single layer of dielectric material having a first refractive index n1, wherein a surface of said single layer of dielectric material includes at least one abrupt change of level forming a step that extends down only within said single layer of dielectric material; and
   an element having a second refractive index n2 that is lower than said first refractive index n1, wherein the element is in contact with said step, and wherein said step is configured to generate a beam that is tilted compared to a propagation direction of said electromagnetic waves.

2. The device of claim 1, wherein said tilted beam has a length that can vary from $\frac{1}{2}\lambda_1$ to several wavelengths, with $\lambda_1$ being a wavelength of said electromagnetic waves in said single layer of dielectric material.

3. The device of claim 2, wherein said device also comprises at least one layer forming a substrate abutting said single layer of dielectric material.

4. The device of claim 3, wherein said device also comprises at least one layer forming a superstrate, said single layer of dielectric material being located between said substrate and said superstrate.

5. The device of claim 4, wherein said substrate and said superstrate are made of the same dielectric material as said single layer of dielectric material.

6. The device of claim 4, wherein a material of said superstrate is selected from the group consisting of: a glass, a plastic, a liquid, and a polymer material.

7. The device of claim 1, further comprising a receiving element positioned along a propagation direction of said tilted beam.

8. The device of claim 7, wherein said receiving element is positioned at a hot spot of said tilted beam.

9. The device of claim 7, wherein said receiving element is positioned at a distance d from said step, where d is between one $\lambda_1$ to $10\lambda_1$, with $\lambda_1$ being a wavelength of said electromagnetic waves in said single layer of dielectric material.

10. The device of claim 1, wherein said tilted beam is associated with an angle of radiation that is defined as a function of one or more of said first refractive index n1, said second refractive index n2, incident angles of said incident electromagnetic waves compared to said step, and a step base angle.

11. The device of claim 1, wherein said device is configured to form beams from said incident electromagnetic waves that are monochromatic electromagnetic waves, each of said monochromatic electromagnetic waves having a wavelength equal to a value that is around 480 nm or 525 nm or 650 nm.

12. The device of claim 1, wherein said step is formed by an edge of at least one cavity made in said single layer of dielectric material.

13. The device of claim 12, wherein said at least one cavity is a through-hole in said single layer of dielectric material.

14. The device of claim 12, wherein said at least one cavity belongs to at least one set of at least two cavities.

15. The device of claim 12, wherein said at least one cavity is targeted to be cylindrical or cone-shaped.

16. The device of claim 1, wherein a height H of said step is targeted to be such that $H > \lambda_1/2$, where $\lambda_1$ is a wavelength of said electromagnetic waves in said single layer of dielectric material.

17. The device of claim 1, wherein said dielectric material is selected from the group consisting of: a glass, a plastic, and a polymer material.

18. A device for forming a field intensity distribution in a near zone, from propagating electromagnetic waves incident on said device, said device comprising:
   at least one layer of dielectric material, said at least one layer of dielectric material having a first refractive index n1, wherein a surface of said dielectric material has at least one abrupt change of level forming a step; and
   an element having a second refractive index n2 that is lower than said first refractive index n1, wherein the second element is in contact with said step, wherein said step generates a beam that is tilted compared to a propagation direction of said electromagnetic waves, and wherein further:

said tilted beam is associated with an angle of radiation that is defined as a function of one or more of said first refractive index n1, said second refractive index n2, incident angles of said incident electromagnetic waves compared to said step, and a step base angle, and said angle of radiation is around a value equal to (90°−a sin(n2/n1))/2.

19. The device of claim 18, wherein said angle of radiation is around 23° when n1=1.49 and n2=1, and around 30°, when n1=2 and n2=1.

* * * * *